(12) United States Patent
Moore et al.

(10) Patent No.: US 10,851,241 B2
(45) Date of Patent: Dec. 1, 2020

(54) ZWITTERION-FUNCTIONALIZED MULTICOMPONENT COPOLYMERS AND ASSOCIATED POLYMER BLENDS AND MEMBRANES

(71) Applicant: General Electric Company, Schenectady, NY (US)

(72) Inventors: David Moore, Rexford, NY (US); Matthew Jeremiah Misner, Delanson, NY (US); Hongyi Zhou, Niskayuna, NY (US); Patrick McCloskey, Watervliet, NY (US); Matthew Rainka, Schenectady, NY (US)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 15/975,900

(22) Filed: May 15, 2018

(65) Prior Publication Data

US 2018/0258285 A1    Sep. 13, 2018

Related U.S. Application Data

(63) Continuation-in-part of application No. 14/958,939, filed on Dec. 4, 2015, and a continuation-in-part of
(Continued)

(51) Int. Cl.
*C08L 81/06* (2006.01)
*B01D 71/68* (2006.01)
(Continued)

(52) U.S. Cl.
CPC .............. *C08L 81/06* (2013.01); *B01D 71/68* (2013.01); *B01D 71/80* (2013.01); *B01D 71/82* (2013.01);
(Continued)

(58) Field of Classification Search
None
See application file for complete search history.

(56) References Cited

U.S. PATENT DOCUMENTS

| | | | |
|---|---|---|---|
| 4,720,343 A | | 1/1988 | Walch et al. |
| 4,758,343 A | * | 7/1988 | Sasaki .................. B01D 69/125 210/500.28 |

(Continued)

FOREIGN PATENT DOCUMENTS

| | | |
|---|---|---|
| CN | 102029117 A | 4/2011 |
| CN | 102294176 A | 12/2011 |

(Continued)

OTHER PUBLICATIONS

Golli-Bennour et al., "Cytotoxic effects exerted by polyarylsulfone dialyser membranes depend on different sterilization processes", 43 In. Urol. Nephrol. 483, 485 (2011). (Year: 2011).

(Continued)

*Primary Examiner* — Krishnan S Menon
*Assistant Examiner* — Brad Gordon
(74) *Attorney, Agent, or Firm* — Jeff B. Vockrodt; Culhane Meadows, PLLC

(57) ABSTRACT

Multicomponent copolymers including two or more types of repeat units is presented. In one example, the multicomponent copolymer includes at least one repeat unit AC having a structure (I), at least one repeat unit DC having a structure (II), and at least one repeat unit BC having a structure (III) or (V). The multicomponent copolymer may be cross-linked via a cross-linking agent. A polymer blend including the multicomponent copolymer or a cross-linked copolymer and a second polymer is also provided. The multicomponent copolymer may be a random or a block copolymer. The structural units of the multicomponent copolymers provide improved, tunable properties, such as improved biocompatibility and hydrophilicity, protein fouling, and mechanical (Continued)

properties, to the copolymers and/or the membranes fabricated from the copolymers.

13 Claims, 8 Drawing Sheets

Related U.S. Application Data application No. 14/958,937, filed on Dec. 4, 2015, and a continuation-in-part of application No. 14/547,306, filed on Nov. 19, 2014, said application No. 14/958,939 is a continuation-in-part of application No. 14/547,306, filed on Nov. 19, 2014, said application No. 14/958,937 is a continuation-in-part of application No. 14/547,306, filed on Nov. 19, 2014.

(51) Int. Cl.
| | |
|---|---|
| C08G 75/20 | (2016.01) |
| B01D 71/80 | (2006.01) |
| C08L 71/00 | (2006.01) |
| C08G 81/00 | (2006.01) |
| B01D 69/08 | (2006.01) |
| C08G 65/40 | (2006.01) |
| B01D 71/82 | (2006.01) |
| C08L 101/00 | (2006.01) |
| B01D 67/00 | (2006.01) |
| B01D 61/24 | (2006.01) |

(52) U.S. Cl.
CPC ......... *C08G 65/4056* (2013.01); *C08G 75/20* (2013.01); *C08L 71/00* (2013.01); *C08L 101/00* (2013.01); *B01D 61/243* (2013.01); *B01D 67/0009* (2013.01); *B01D 69/08* (2013.01); *B01D 2323/30* (2013.01); *B01D 2325/18* (2013.01); *B01D 2325/28* (2013.01); *B01D 2325/36* (2013.01); *C08G 81/00* (2013.01); *C08L 2203/16* (2013.01)

(56) References Cited

U.S. PATENT DOCUMENTS

| | | | |
|---|---|---|---|
| 4,970,034 | A | 11/1990 | Ly et al. |
| 5,043,398 | A | 8/1991 | Auerbach et al. |
| 5,071,448 | A | 12/1991 | Bikson et al. |
| 6,150,432 | A | 11/2000 | Jones et al. |
| 7,105,591 | B2 | 9/2006 | Weber et al. |
| 7,985,339 | B2 | 7/2011 | Zhang et al. |
| 9,034,957 | B2 | 5/2015 | Jensvold et al. |
| 9,085,542 | B1 | 7/2015 | McCloskey et al. |
| 2002/0103366 | A1 | 8/2002 | Bellon et al. |
| 2004/0168980 | A1 | 9/2004 | Musale et al. |
| 2007/0102349 | A1 | 5/2007 | Duong et al. |
| 2007/0119781 | A1 | 5/2007 | Huang et al. |
| 2008/0203012 | A1 | 8/2008 | Yeager et al. |
| 2008/0312349 | A1 | 12/2008 | Yeager et al. |
| 2010/0044314 | A1* | 2/2010 | Zhang ............... B01D 71/68 210/646 |
| 2011/0290709 | A1 | 12/2011 | Ohno et al. |
| 2011/0305872 | A1 | 12/2011 | Li et al. |
| 2012/0207659 | A1 | 8/2012 | Pinard et al. |
| 2014/0094671 | A1 | 4/2014 | Boock et al. |
| 2014/0221596 | A1 | 8/2014 | Liu et al. |
| 2015/0165389 | A1 | 6/2015 | McGinniss et al. |
| 2015/0328597 | A1 | 11/2015 | McCloskey et al. |
| 2016/0136587 | A1 | 5/2016 | McCloskey et al. |
| 2016/0136588 | A1 | 5/2016 | Zhou et al. |
| 2016/0136589 | A1 | 5/2016 | Misner et al. |

FOREIGN PATENT DOCUMENTS

| | | |
|---|---|---|
| CN | 102294177 B | 6/2013 |
| CN | 103861466 A | 6/2014 |
| WO | 2010/024755 A1 | 3/2010 |
| WO | 2013034611 A1 | 3/2013 |
| WO | 2015070004 A1 | 5/2015 |
| WO | 2017096126 A1 | 6/2017 |
| WO | 2017096140 A1 | 6/2017 |

OTHER PUBLICATIONS

Shi et al., "Zwitterionic polythersulfone ultrafiltration membrane with superior antifouling property", Journal of Membrane Science, Science Direct., Jul. 1, 2008, vol. 319, Issues 1-2, pp. 271-278.
Yu et al., "Enhancing antifouling property of polysulfonne ultrafiltration membrane by grafting zwitterionic copolymer via UV-inititated polymerization" Journal of Membrane Science, Science Direct., Oct. 15, 2009, vol. 342, Issues 1-2, pp. 6-13.
Razi et al., "The improvement of antibiofouling efficiency of polythersulfone membrane by functionalization with zwitterionic monomers", Journal of Membrane Science, Science Direct., May 15, 2012, vols. 401-402, pp. 292-299.
Zhao et al., "Improving the hydrophilicity and fouling-resistance of polysulfone ultrafiltration membranes via surface zwitterionicalization mediated by polysulfone-based triblock copolymer additive", Journal of Membrane Science, Science Direct., Aug. 1, 2013, vol. 440, pp. 40-47.
Idris et al., Novel high performance hollow fiber ultrafiltration membranes spoun from LiBr doped solutions, Desalination, vol. 249, Issue 2, pp. 541-548 (Dec. 15, 2009).
Zhang et al., "Synthesis and characterization of novel cardo poly(aryl ether sulfone) bearing zwitterionic side groups for proton exchange membranes", International Journal of Hydrogen Energy, vol. 36, Issue 9, pp. 5512-5520 (May 2011).
Zhang et al., "Novel zwitterionic poly(arylene ether sulfone)s as antifouling membrane material", Journal of Membrane Science, Mar. 1, 2010, vol. 349, No. 1-2, pp. 217-224.
International Search Report and Written Opinion corresponding to PCT Application No. PCT/EP2015/076760 dated Feb. 9, 2016.
International Search Report and Written Opinion corresponding to PCT Application No. PCT/US2016/064576 dated Feb. 16, 2017.
International Search Report and Written Opinion corresponding to PCT Application No. PCT/US2016/064557 dated Feb. 17, 2017.
International Preliminary Report of Patentability and Written Opinion corresponding to PCT Application No. PCT/EP2015/076760 dated May 23, 2017.
Higuchi et al., "Chemically Modified Polysulfone Hollow Fibers with Zwitterionic Sulfoalkylbetaine Group Having Improved Blood Compatibility", Advanced Materials for Membrane Separations, Chapter: 25, vol. 876, pp. 366-382, 2004.
Zhao et al., "Highly hydrophilic and low-protein-fouling polypropylene membrane prepared by surface modification with sulfobetaine-based zwitterionic polymer through a combined surface polymerization method", Journal of Membrane Science, vol. 362, Issues: 1-2, pp. 326-333, Oct. 15, 2010.
Kapantaidakis et al., "High flux polyethersulfone-polyimide blend hollow fiber membranes for gas separation", Journal of Membrane Science, vol. 204, Issues: 1-2, pp. 153-171, Jul. 15, 2002.
European Communication under Rule 71(3) EPC corresponding to EP Application No. 09810305.4, dated Feb. 27, 2019.
International Search Report and Written Opinion corresponding to International Application No. PCT/EP2019/061885, dated Jul. 29, 2019.
Koberle, P., et al., "Hydrophobically Modified Zwitterionic Polymers: Synthesis, Bulk Properties, and Miscibility with Inorganic Salts", Macromolecules, American Chemical Society, 1994, vol. 27, pp. 2165-2173.
China First Office Action with Search Report corresponding to Chinese Application No. 201580073802.8, dated Nov. 8, 2019 (with English Translation).

(56) References Cited

OTHER PUBLICATIONS

Moe, Lui, "Membrane Separation Technology", Chemical Industry Press, Aug. 1998, pp. 47-48.

* cited by examiner 8A  8B

ZWITTERION-FUNCTIONALIZED MULTICOMPONENT COPOLYMERS AND ASSOCIATED POLYMER BLENDS AND MEMBRANES

BACKGROUND

Porous polymeric membranes, either in hollow-fiber or flat sheet configurations, may be employed in many applications, such as, hemodialysis, ultrafiltration, nanofiltration, reverse osmosis, gas separation, microfiltration, and pervaporation. For many of these applications, membranes with optimal selectivity as well as chemical, thermal and mechanical stability are desirable. In many applications (for example, bio-separation or water filtration) it may also be desirable to have membranes with improved hydrophilicity, improved biocompatibility, low protein fouling, and improved mechanical properties.

Polyarylene ethers, in particular, polyethersulfones and polysulfones are often used as membrane materials because of their mechanical, thermal, and chemical stability. However, these polymers may not have optimal biocompatibility and hydrophilicity for many applications. Multiple approaches have been reported to lead to improvements in membrane hydrophilicity. However, such improvements have also been shown to be accompanied by other undesired properties. In one example, improvements in membrane hydrophilicity have been reported by using polymer blending, for example, fabricating porous polymeric membranes in the presence of small amounts of hydrophilic polymers such as polyvinylpyrollidone (PVP). However, since PVP is water-soluble, it may slowly leach from the porous polymer matrix, creating product variability.

In another example, surface treatment or functionalization has been reported to improve membrane hydrophilicity and biocompatibility. However, these chemical modifications may be complicated, expensive and inefficient. In addition, some amounts of unreacted chemicals may still be present on the membrane, which may become a source of leachable and extractable in applications such as filtration.

In other examples, improved biocompatibility and hydrophilicity may be achieved via functionalization of carboxyl, nitrile or polyethylene glycol groups in a polymer backbone. However, these functionalities typically reduce chemical resistance and thermal and mechanical properties.

Thus, the field is still in need of polymers and associated membranes with improved properties including, but not limited to, improved biocompatibility and hydrophilicity, protein fouling, and mechanical properties.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, a multicomponent copolymer is provided, the copolymer includes at least one repeat unit AC having a structure (I), at least one repeat unit DC having a structure (II), and at least one repeat unit BC having a structure (III):

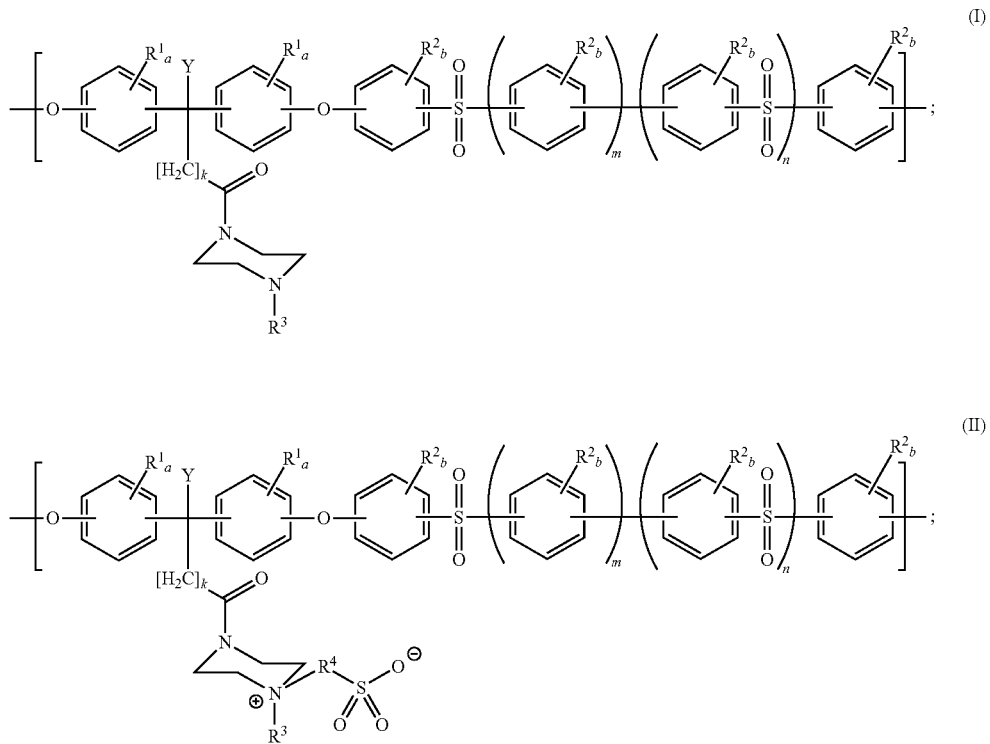

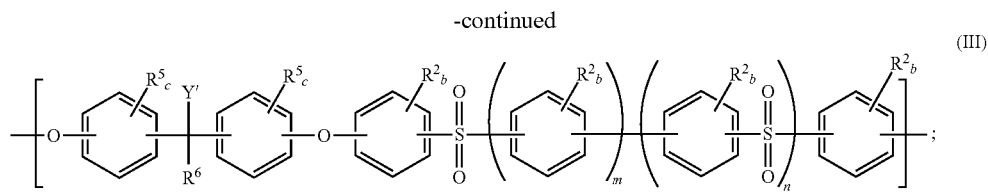

wherein "a", "b" and "c" are independently at each occurrence 1, 2, 3, or 4;
"k" ranges from 0 to 10;
"m" and "n" are each, independently, 0 or 1;
$R^1$, $R^2$ and $R^5$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical;
$R^3$, Y, Y' and $R^6$ are each, independently, a hydrogen atom, a $C_1$-$C_{12}$ aliphatic radical, a $C_3$-$C_{12}$ cycloaliphatic radical, or a $C_3$-$C_{12}$ aromatic radical;
$R^4$ is a bond, a $C_1$-$C_{12}$ aliphatic radical, a $C_3$-$C_{12}$ cycloaliphatic radical, or a $C_3$-$C_{12}$ aromatic radical; and
wherein the copolymer has a formula $[(AC)_{P*S}$-$(DC)_{Z*S}$—$(BC)_R]_N$ wherein S is a mole fraction of a total piperazine content, P*S is a mole fraction of a piperazine content of the repeat unit AC, Z*S is a mole fraction of a zwitterion content of the repeat unit DC, R is a mole fraction of the repeat unit BC in the copolymer, and where P+Z=1, S+R=1, and N is a degree of polymerization.

In another embodiment, a membrane that includes the multicomponent copolymer above is provided.

In yet another embodiment, a method of making the multicomponent copolymer above is provided.

BRIEF DESCRIPTION OF THE DRAWINGS

These and other features, aspects, and advantages of the present disclosure will become better understood when the following detailed description is read with reference to the accompanying drawings, where.

DETAILED DESCRIPTION

Figure 1:
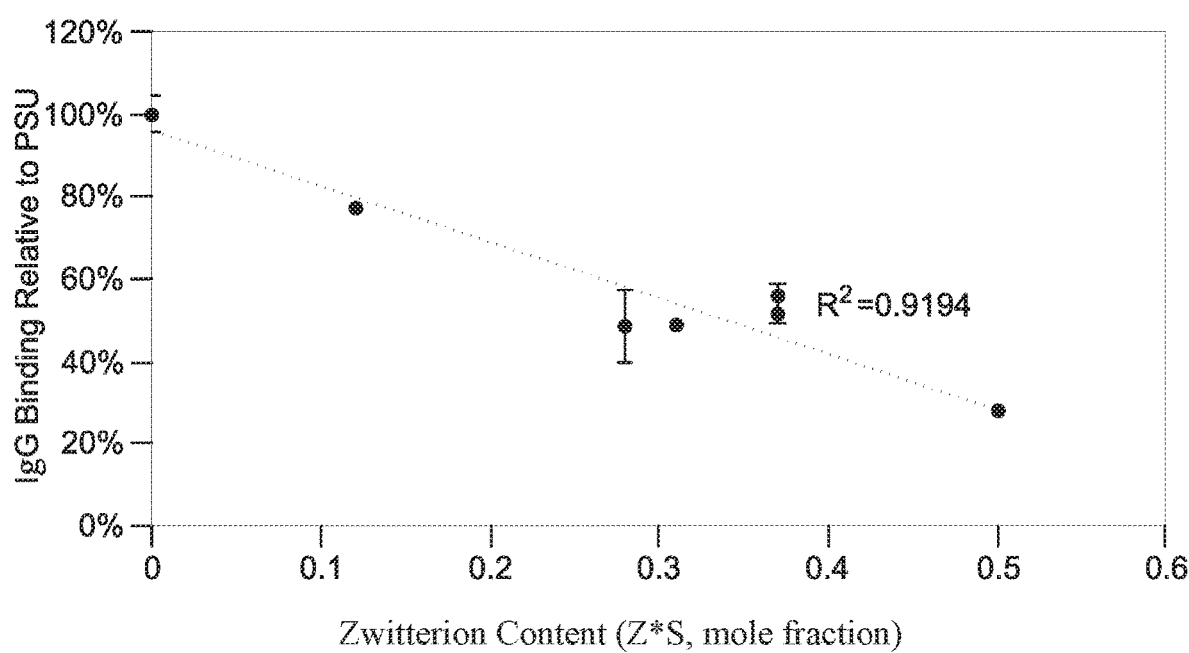
FIG. 1 shows effects of zwitterion content on protein fouling, according to embodiments of the present disclosure.

As discussed in detail below, certain embodiments of the present disclosure include copolymers and its associated polymer blends and membranes. More particularly, certain embodiments of the present disclosure relate to multicomponent copolymers comprising zwitterion functional groups, and their associated polymer blends and membranes. In addition, certain embodiments of the present disclosure include conversion, functionalization and cross-linking of the multicomponent copolymers.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the term "zwitterion functional group" or "zwitterion" as used herein refers to a moiety including both positively and negatively charged groups in the same molecule. Non-limiting examples of the negative-charged component, "Z", of the zwitterion functional group include, but are not limited to, $SO_3^-$ and $CO_2^-$.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical, which comprises a phenyl ring (the aromatic group) and a methylene group (the nonaromatic component). Similarly, a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC(CF$_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoyl-phen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl (C$_3$H$_2$N$_2$—) represents a $C_3$ aromatic radical. The benzyl radical (C$_7$H$_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group (C$_6$H$_{11}$CH$_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms, which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis (cyclohex-4-yl) (i.e., —C$_6$H$_{10}$C(CF$_3$)$_2$ C$_6$H$_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$NC$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —O C$_6$H$_{10}$(CH$_2$)$_6$C$_6$H$_{10}$—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis(cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a $C_4$ cycloaliphatic radical. The cyclohexylmethyl radical (C$_6$H$_{11}$CH$_2$—) represents a $C_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$ CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH$_2$)$_9$—) is an example of a C$_{10}$ aliphatic radical.

As used herein, the term "haloalkane" refers to an alkane substituted with one or more halide atoms, typically selected from the group consisting of chlorine, bromine and iodine. The alkane can typically comprise 2-12 carbon atoms and can be straight or branched.

As discussed in detail below, certain embodiments of the present disclosure are directed to a multicomponent copolymer. The term "multicomponent copolymer" as used herein refers to a macromolecule comprising two or more types of repeat units in the polymer chain. In certain embodiments, repeat units may have a structural unit of a monomer or a dimer formed from a reaction between two monomers. As discussed in detail below, examples of multicomponent copolymers include, but are not limited to, a bipolymer that comprises two types of repeat units in the polymer chain, a terpolymer that comprises three types of repeat units in the polymer chain, and a quaterpolymer that comprises four types of repeat units in the polymer chain. The term "multicomponent copolymer" and "copolymer" may be used interchangeably throughout the present disclosure.

According to certain embodiments of the present disclosure, the multicomponent copolymer may be a random copolymer or a block copolymer. The term "random copolymer" or "random multicomponent copolymer" as used herein refers to a macromolecule comprising two or more types of repeat units in the polymer chain with randomly distributed sequences of each of the two or more types of repeat units, for example, a random bipolymer, a random terpolymer, etc.

In certain embodiments, a random bipolymer is provided. The random bipolymer comprises at least one repeat unit AC having a structure (I) and at least one repeat unit BC having a structure (III) as described above, and the copolymer has randomly distributed sequences of each of the repeat units AC and BC.

In certain embodiments, a random terpolymer is provided. The random AC-BC-DC terpolymer comprises at least one repeat unit AC having a structure (I), at least one repeat unit BC having a structure (III), and at least one repeat unit DC having a structure (II), and the copolymer has randomly distributed sequences of each of the repeat units AC, BC and DC.

In certain embodiments, a random terpolymer is provided. The random AC-BC-DC terpolymer comprises at least one repeat unit AC having a structure (I), at least one repeat unit BC having a structure (V), and at least one repeat unit DC having a structure (II), and the copolymer has randomly distributed sequences of each of the repeat units AC, BC and DC.

The term "block copolymer" or "block multicomponent copolymer" as used herein refers to a macromolecule comprising two or more types of repeat units in the polymer chain, in which blocks of repeat units of the same type are arranged substantially in sequences in the polymer chain. For example, a block (DC)-(BC) copolymer includes a first block formed from a plurality of repeat units of the same type (for example, repeat units DC); and a second block formed from a plurality of repeat units of another same type (repeat units BC). The blocks DC and BC may have the same or different block length, that is, the number of repeat units in the two blocks may be the same or different. Similarly, a (AC)-(DC)-(BC) block terpolymer includes a first block (AC) formed from a plurality of repeat units of the same type (repeat units AC); a second block DC formed from a plurality of repeat units of another same type (repeat units DC), and a third block BC formed from a plurality of repeat units of yet another same type (repeat units BC). Further, the term "block copolymer" as used herein refers to the zwitterion-functionalized block copolymer, unless the context clearly indicates otherwise.

In certain embodiments, a block bipolymer is provided. The block bipolymer includes a first block (AC)$_q$ comprising two or more repeat units AC each having the same structure (I); and a second block (BC)$_r$ comprising two or more repeat units BC each having the same structure (III), where q and r are integers equal or greater than 2 and correspond to block lengths of the blocks (AC)$_q$ and (BC)$_r$, respectively. The blocks (AC)$_q$ and (BC)$_r$ may have the same or different block lengths. Therefore, the number of repeat units in the two blocks, q and r, respectively, may be the same or different. The blocks (AC)$_q$ and (BC)$_r$ may be arranged substantially in sequences in the polymer chain.

In certain embodiments, a block terpolymer is provided. The block terpolymer includes a first block (AC)$_q$ comprising two or more repeat units AC, each repeat unit AC having the same structure (I); a second block (BC)$_r$ comprising two or more repeat units BC, each repeat unit BC having the same structure (III), and a third block (DC)$_t$ comprising two or more repeat units DC, each repeat unit DC having the same structure (II), wherein q, r and t are integers equal or greater than 2 and correspond to block lengths of blocks (AC)$_q$, (BC)$_r$ and (DC)$_t$, respectively. The blocks (AC)$_q$, (BC)$_r$ and (DC)$_t$ may be arranged substantially in sequences in the polymer chain. The blocks (AC)$_q$, (BC)$_r$ and (DC)$_t$ may have the same block length or block lengths different from each other. Also, the number of repeat units in each of the three blocks, for example, q, r and t, respectively, may be the same or different from each other.

In certain embodiments, a block terpolymer is provided. The block terpolymer includes a first block (AC)$_q$ comprising two or more repeat units AC, each repeat unit AC having the same structure (I); a second block (BC)$_r$ comprising two or more repeat units BC, each repeat unit BC having the same structure (V), and a third block (DC)$_t$ comprising two or more repeat units DC, each repeat unit DC having the same structure (II), wherein q, r and t are integers equal or greater than 2 and correspond to block lengths of blocks (AC)$_q$, (BC)$_r$ and (DC)$_t$, respectively. The blocks (AC)$_q$, (BC)$_r$ and (DC)$_t$ may be arranged substantially in sequences in the polymer chain. The blocks (AC)$_q$, (BC)$_r$ and (DC)$_t$ may have the same block length or block lengths different from each other. Also, the number of repeat units in each of the three blocks, for example, q, r and t, respectively, may be the same or different from each other.

In certain embodiments, a block copolymer comprising four or more repeat units is provided. The block copolymer comprises a first block comprising two or more repeat units AC, a second block comprising two or more repeat units BC, a third block comprising two or more repeat units DC, and a fourth block comprising two or more repeat units different from any of the repeat units AC, BC and DC.

As discussed in detail below, certain embodiments of the present disclosure are directed to multicomponent copolymers comprising at least one repeat unit AC, at least one repeat unit BC, and at least one repeat unit DC.

In certain embodiments, the at least one repeat unit AC has a structure (I):

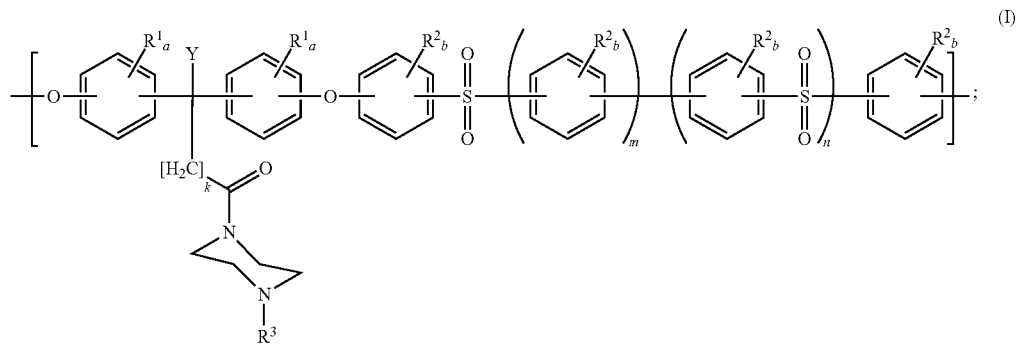

wherein "a" and "b" are independently at each occurrence 1, 2, 3, or 4;
"k" ranges from 0 to 10;
"m" and "n" are each, independently, 0 or 1;
$R^1$ and $R^2$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical; and
$R^3$ and Y are each, independently, a hydrogen atom, a $C_1$-$C_{12}$ aliphatic radical, a $C_3$-$C_{12}$ cycloaliphatic radical, or a $C_3$-$C_{12}$ aromatic radical.

In certain embodiments, the at least one repeat unit AC has the structure (I) above, wherein "k" ranges from 1 to 4; both "m" and "n" are 0; and $R^1$, $R^2$, $R^3$ and Y are independently at each occurrence a hydrogen atom or a $C_1$-$C_4$ aliphatic radical.

In a preferred embodiment, the at least one repeat unit AC has a structure (Ib):

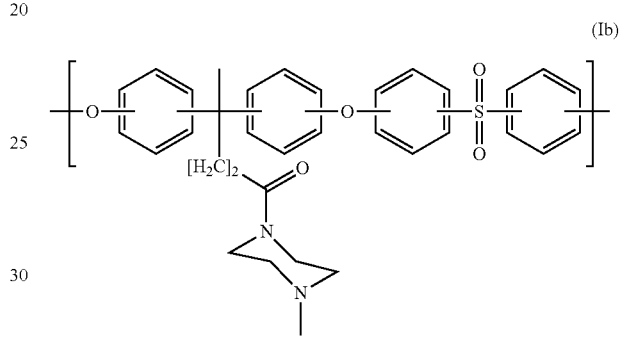

In certain embodiments, the at least one repeat unit BC has a structure (III):

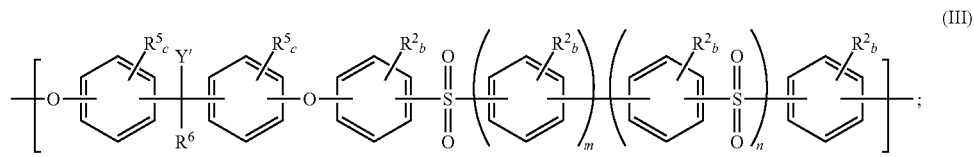

wherein "b" and "c" is independently at each occurrence 1, 2, 3, or 4;
"m" and "n" are each, independently, 0 or 1;
$R^2$ and $R^5$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical, and
Y' and $R^6$ are each, independently, a hydrogen atom, a $C_1$-$C_{12}$ aliphatic radical, a $C_3$-$C_{12}$ cycloaliphatic radical, or a $C_3$-$C_{12}$ aromatic radical.

In certain embodiments, the at least one repeat unit BC has the structure (III) above, wherein both "i" and "n" are 0; and $R^2$, $R^5$, $R^6$ and Y' are independently at each occurrence a hydrogen atom or a $C_1$-$C_4$ aliphatic radical.

In certain embodiments, the at least one repeat unit BC has a structure (V):

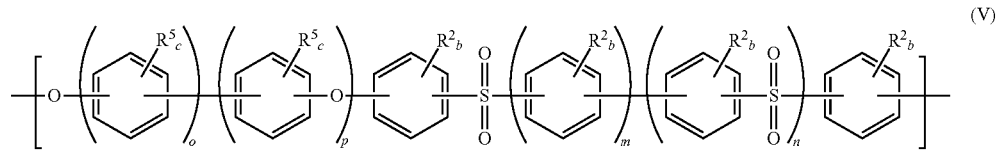

wherein "b" and "c" are independently at each occurrence 1, 2, 3, or 4;

"o", "p", "m" and "n" are each, independently, 0 or 1; and $R^2$ and $R^5$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical.

In certain embodiments, the at least one repeat unit BC has the structure (V) wherein o is 1, p is 0, m is 0 and n is 0.

In certain embodiments, the at least one repeat unit BC has the structure (V) wherein o is 1, p is 1, m is 0 and n is 0.

In certain embodiments, the at least one repeat unit BC has the structure (V) wherein o is 0, p is 0, m is 0 and n is 0.

In a preferred embodiment, the at least one repeat unit BC has a structure (IIIb) wherein both "b" and "c" are 4, and both $R^2$ and $R^5$ are a hydrogen atom:

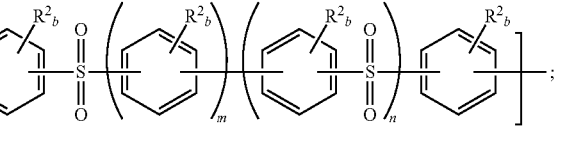

(IIIb)

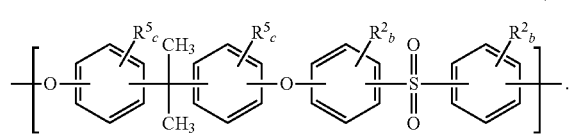

Other non-limiting examples of suitable repeat units BC include thermoplastic polymers such as polysulfones, polyethersulfones, polyketones, polyetherketones, or polyetheretherketones, or any combinations thereof. In certain embodiments, the repeat units BC include polysulfone, polyethersulfone, or both.

In certain embodiments, the at least one repeat unit DC has a structure (II):

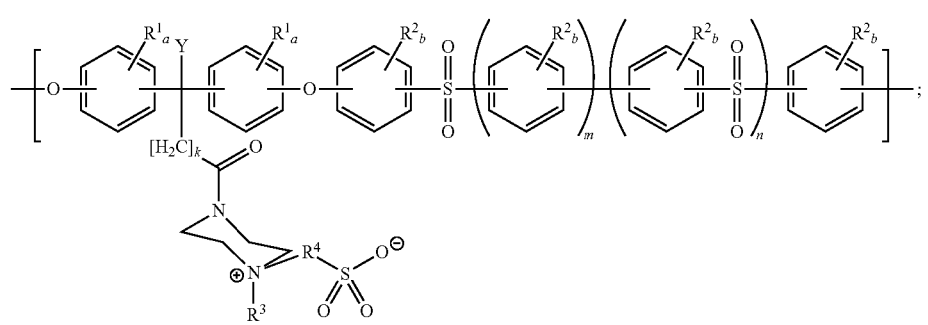

(II)

wherein "a" and "b" are independently at each occurrence 1, 2, 3, or 4;

"k" ranges from 0 to 10;

"m" and "n" are each, independently, 0 or 1;

$R^1$ and $R^2$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical;

$R^3$ and Y are independently at each occurrence a hydrogen atom, a $C_1$-$C_{12}$ aliphatic radical, a $C_3$-$C_{12}$ cycloaliphatic radical, or a $C_3$-$C_{12}$ aromatic radical;

$R^4$ is a bond, a $C_1$-$C_{12}$ aliphatic radical, a $C_3$-$C_{12}$ cycloaliphatic radical, or a $C_3$-$C_{12}$ aromatic radical.

In certain embodiments, the at least one repeat unit DC has a structure (IIa):

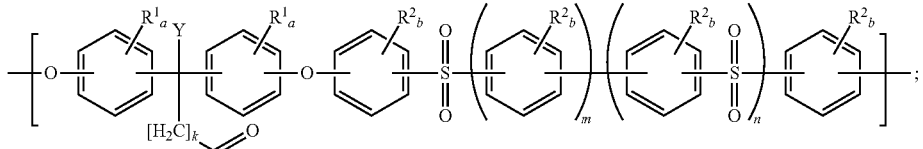
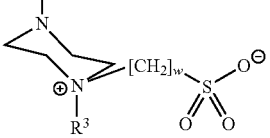

(IIa)

wherein "a" and "b" are independently at each occurrence 1, 2, 3, or 4;

"k" ranges from 0 to 10;

"m" and "n" are each, independently, 0 or 1;

"w" ranges from 1 to 10;

$R^1$ and $R^2$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical;

$R^3$ and Y are independently at each occurrence a hydrogen atom, a $C_1$-$C_{12}$ aliphatic radical, a $C_3$-$C_{12}$ cycloaliphatic radical, or a $C_3$-$C_{12}$ aromatic radical.

In certain embodiments, the at least one repeat unit DC has a structure (IIa) above, wherein "k" ranges from 1 to 4, "w" ranges from 2 to 5, and $R^3$ and Y are each, independently, a hydrogen atom or a $C_1$-$C_4$ aliphatic radical.

In a preferred embodiment, the at least one repeat unit DC has a structure (IIb):

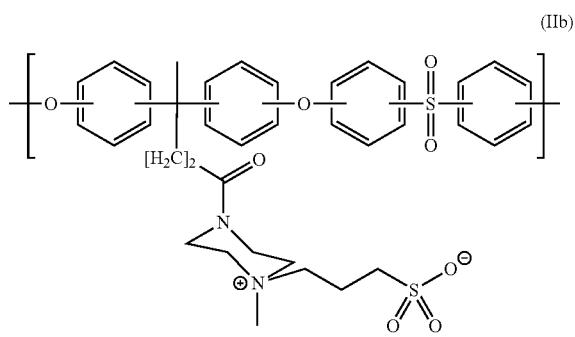

(IIb)

The multicomponent AC-BC-DC copolymer may be characterized by the numbers of repeat units in the polymer chain, for example, $(AC)_q$-$(BC)_r$-$(DC)_t$ copolymer, wherein q, r and t are integers equal or greater than 1 and correspond to numbers of repeat units AC, BC and DC, respectively, as discussed above. In certain embodiments, the number of AC repeat units ranges from about 1 to about 50. In certain embodiments, the number of BC repeat units ranges from about 2 to about 25. In certain embodiments, the number of DC repeat units ranges from about 5 to about 15.

In certain embodiments, the copolymers may be characterized by mole fractions of repeat units. For example, in certain embodiments, the multicomponent AC-BC-DC copolymer includes at least one repeat unit AC, at least one repeat unit BC, and at least one repeat unit DC and has a formula of $[(AC)_{P*S}\text{-}(DC)_{Z*S}\text{-}(BC)_R]_N$ where S is a mole fraction of a total piperazine content, P*S is a mole fraction of a piperazine content, Z*S is a mole fraction of a zwitterion content, and R is a mole fraction of the repeat unit BC in the copolymer, and wherein P+Z=1, S+R=1, and N is a degree of polymerization. Both repeat units AC and DC include piperazine-containing groups, or piperazine content, with the repeat unit AC having a free piperazine content (P*S) and repeat unit DC having a zwitterion content (Z*S).

As defined herein, a mole fraction of the total piperazine content (S) in the copolymer is a sum of a mole fraction of the piperazine content (P*S) of the repeat unit(s) AC and a mole fraction of the zwitterion content (Z*S) of the repeat unit(s) DC in the copolymer. In certain embodiments, S ranges from about 0.02 to about 0.98. In certain embodiments, Z*S ranges from about 0.02 to about 0.98; ranges from about 0.25 to about 0.75 in certain embodiments; and ranges from about 0.30 to about 0.50 in certain embodiments. In certain embodiments, R ranges from about 0.02 to about 0.98.

In certain embodiments, a random AC-BC-DC multicomponent copolymer is provided. The random AC-BC-DC copolymer comprises at least one repeat unit AC having a structure (I), at least one repeat unit BC having a structure (III), and at least one repeat unit DC having a structure (II), with each of the at least one repeat unit AC, BC and DC arranged randomly in the polymer chain.

In certain embodiments, a block AC-BC-DC multicomponent copolymer is provided. The block AC-BC-DC multicomponent copolymer comprises a first block AC comprising two or more repeat units AC, each repeat unit AC having a structure (I); a second block BC comprising two or more repeat units BC, each repeat unit BC having a structure (III), and a third block DC comprising two or more repeat units DC, each repeat unit DC having a structure (II). The blocks AC, BC and DC are arranged substantially in sequences in the polymer chain.

For simplified illustration, the terms "block AC", "block BC" and "block DC" may be used throughout the present disclosure to refer to blocks comprising two or more repeat units of AC, BC and DC, respectively. Non-limiting examples of a block multicomponent copolymer may include at least one block AC having a structure (I), at least one block BC having a structure (III), and at least one block DC having a structure (II).

In certain embodiments, the block copolymer may include at least one block AC having a structure (Ib), at least one block BC having a structure (IIIb), and at least one block DC having a structure (IIa) or (IIb).

In certain embodiments, the at least one block unit AC has the structure (I), wherein "k" ranges from 1 to 4; both "m" and "n" are 0; and $R^1$, $R^2$, $R^3$ and Y are independently at each occurrence a hydrogen atom or a $C_1$-$C_4$ aliphatic radical. In a preferred embodiment, the at least one block AC has a structure (Ib).

In certain embodiments, the at least one block BC has the structure (III), wherein both "m" and "n" are 0; and $R^2$, $R^5$, $R^6$ and Y' are independently at each occurrence a hydrogen atom or a $C_1$-$C_4$ aliphatic radical. In a preferred embodiment, the at least one block BC has a structure (IIIb) wherein both "b" and "c" are 1, and $R^2$ and $R^5$ are a hydrogen atom.

In certain embodiments, the at least one block DC has a structure (IIa), wherein "k" ranges from 1 to 4, "w" ranges from 2 to 5, and $R^3$ and Y are each, independently, a hydrogen atom or a $C_1$-$C_4$ aliphatic radical. In a preferred embodiment, the at least one block DC has a structure (IIb).

In certain embodiments, the block copolymer has a formula of $[(AC)_{P*S}\text{-}(DC)_{Z*S}\text{-}(BC)_R]_N$, as described above. In certain embodiments, the block copolymer has structural units of $(AC)_o$-$(BC)_p$-$(DC)_q$, as described above. The blocks AC, BC and DC may have block lengths of from about 2 to about 50 repeat units and the blocks comprising structural units I, II and III may be arranged in any particular order including, but not limited to, I-II-III, III-I-II, II-III-I, I-II-I-III-II. Any other orders of arranging the structural units I, II and III of the blocks AC, DC and BC, respectively, are within the scope of this formula.

The multicomponent copolymers may be a random or a block copolymer and may be synthesized using any suitable techniques.

In certain embodiments, the copolymers may be synthesized by polycondensation reactions through nucleophilic aromatic substitution of aromatic dihalide compounds with aromatic dihydroxy compounds in a polar aprotic solvent in the presence of a base, and optionally, in the presence of catalysts.

In one embodiment, a method of making a multicomponent copolymer includes: mixing an aromatic dihalide compound, an aromatic dihydroxy compound and a chain stopper compound in a polar aprotic solvent to form a mixture; adding, to the mixture, a base and an azeotrope-forming solvent for forming an azeotrope with water; removing the polar aprotic solvent and the azeotrope under heat to obtain a slurry; adding a dihalodiphenyl sulfone to the slurry and allowing polymerization to proceed until a targeted molecular weight or a predefined time was achieved to form an intermediate copolymer; reacting a sultone compound with the intermediate copolymer in the polar aprotic solvent to produce the multicomponent copolymer.

In certain embodiments, the method further includes separating the intermediate polymer before reacting with the sultone compound.

In certain embodiments, the multicomponent copolymer includes at least one repeat unit AC having a structure (I), at least one repeat unit DC having a structure (II), and at least one repeat unit BC having a structure (III). In certain embodiments, the intermediate copolymer is a bipolymer including at least one repeat unit AC having a structure (I), and at least one repeat unit BC having a structure (III).

Non-limiting examples of suitable aromatic dihalide compounds include 4,4'-bis(chlorophenyl)sulfone, 2,4'-bis(chlorophenyl)sulfone, 2,4-bis(chlorophenyl)sulfone, 4,4'-bis(fluorophenyl)sulfone, 2,4'-bis(fluorophenyl)sulfone, 2,4-bis(fluorophenyl)sulfone, 4,4'-bis(chlorophenyl)sulfoxide, 2,4'-bis(chlorophenyl)sulfoxide, 2,4-bis(chlorophenyl)sulfoxide, 4,4'-bis(fluorophenyl)sulfoxide, 2,4'-bis(fluorophenyl)sulfoxide, 2,4-bis(fluorophenyl)sulfoxide, 4,4'-bis(fluorophenyl)ketone, 2,4'-bis(fluorophenyl)ketone, 2,4-bis(fluorophenyl)ketone, 1,3-bis(4-fluorobenzoyl)benzene, 1,4-bis(4-fluorobenzoyl)benzene, 4,4'-bis(4-chlorophenyl)phenylphosphine oxide, 4,4'-bis(4-fluorophenyl)phenylphosphine oxide, 4,4'-bis(4-fluorophenylsulfonyl)-1,1'-biphenyl, 4,4'-bis(4-chlorophenylsulfonyl)-1,1'-biphenyl, 4,4'-bis(4-fluorophenylsulfoxide)-1,1'-biphenyl, 4,4'-bis(4-chlorophenylsulfoxide)-1,1'-biphenyl, and combinations thereof.

Non-limiting examples of suitable aromatic dihydroxy compounds that may be used include 4,4'-dihydroxyphenyl sulfone, 2,4'-dihydroxyphenyl sulfone, 4,4'-dihydroxyphenyl sulfoxide, 2,4'-dihydroxyphenyl sulfoxide, bis(3,5-dimethyl-4-hydroxyphenyl) sulfoxide, bis(3,5-dimethyl-4-hydroxyphenyl) sulfone, 4,4-(phenylphosphinyl)diphenol, 4,4'-oxydiphenol,4,4'-thiodiphenol, 4,4'-dihydroxybenzophenone, 4,4'dihydroxyphenylmethane, hydroquinone, resorcinol, 5-cyano-1,3-dihydroxybenzene, 4-cyano-1,3,-dihydroxybenzene, 2-cyano-1,4-dihydroxybenzene, 2-methoxyhydroquinone, 2,2'-biphenol, 4,4'-biphenol, 2,2'-dimethylbiphenol 2,2',6,6'-tetramethylbiphenol, 2,2',3,3',6,6'-hexamethylbiphenol, 3,3',5,5'-tetrabromo-2,2'6,6'-tetramethylbiphenol, 4,4'-isopropylidenediphenol (bisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'-isopropylidenebis(2-allyl-6-methylphenol), 4,4'(1,3-phenylenediisopropylidene) bisphenol (bisphenol M), 4,4'-isopropylidenebis(3-phenylphenol), 4,4'-isopropylidene-bis(2-phenylphenol), 4,4'-(1,4-phenylenediisoproylidene)bisphenol (bisphenol P), 4,4'-ethylidenediphenol (bisphenol E), 4,4'-oxydiphenol, 4,4'-thiodiphenol, 4,4'-thiobis(2,6-dimethylphenol), 4,4'-sufonyldiphenol, 4,4'-sufonylbis(2,6-dimethylphenol) 4,4'-sulfinyldiphenol, 4,4'-hexafluoroisoproylidene)bisphenol (Bisphenol AF), 4,4'-hexafluoroisoproylidene) bis(2,6-dimethylphenol), 4,4'-(1-phenylethylidene)bisphenol (Bisphenol AP), 4,4'-(1-phenylethylidene)bis(2,6-dimethylphenol), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 2,2-bis(4-hydroxyphenyl) butane, 3,3-bis(4-hydroxyphenyl)pentane, 4,4'-(cyclopentylidene)diphenol, 4,4'-(cyclohexylidene)diphenol (Bisphenol Z), 4,4'-(cyclohexylidene)bis(2-methylphenol), 4,4'-(cyclododecylidene)diphenol, 4,4'-(bicyclo[2.2.1]heptylidene)diphenol, 4,4'-(9H-fluorene-9,9-diyl)diphenol, 3,3'-bis(4-hydroxyphenyl)isobenzofuran-1(3H)-one, 1-(4-hydroxyphenyl)-3,3'-dimethyl-2,3-dihydro-1H-inden-5-ol, 1-(4-hydroxy-3,5-dimethylphenyl)-1,3,3',4,6-pentamethyl-2,3-dihydro-1H-in-den-5-ol, 3,3,3',3'-tetramethyl-2,2',3,3'-tetrahydro-1,1'-spirobi[indene]-5,6'-diol (Spirobiindane), dihydroxybenzophenone (bisphenol K), thiodiphenol (Bisphenol S), bis(4-hydroxyphenyl) diphenyl methane, bis(4-hydroxyphenoxy)-4,4'-biphenyl, 4,4'-bis(4-hydroxyphenyl) diphenyl ether, 9,9-bis(3-methyl-4-hydroxyphenyl)fluorene, N-phenyl-3,3-bis-(4-hydroxyphenyl)phthalimide, and combinations thereof.

Non-limiting examples of dihalodiphenyl sulfone include 4,4'-bis(fluorophenyl)sulfone (DFDPS), 4,4'-bis(chlorophenyl)sulfone, (DCDPS) 2,4'-bis(chlorophenyl)sulfone, 2,4-bis(chlorophenyl)sulfone, 2,4'-bis(fluorophenyl)sulfone, and 2,4-bis(fluorophenyl)sulfone.

Any chain stopper compound known to one skilled in the art may be used. Non-limiting examples of a chain stopper compound include p-cumyl phenol.

Non-limiting examples of the azeotrope-forming solvent include toluene, benzene, xylene, ethylbenzene, chlorobenzene, or any combinations thereof.

A base may be used to affect the reaction between the aromatic dihalo and aromatic dihydroxy compounds. Non-limiting examples of a base include alkali metal hydroxides including, but not limited to, lithium hydroxide, sodium hydroxide, potassium hydroxide, rubidium hydroxide, and cesium hydroxide; alkali metal carbonates including, but not limited to, lithium carbonate, sodium carbonate, potassium carbonate, rubidium carbonate, and cesium carbonate; and alkali metal hydrogen carbonates including, but not limited to, lithium hydrogen carbonate, sodium hydrogen carbonate, potassium hydrogen carbonate, rubidium hydrogen carbonate, and cesium hydrogen carbonate. Combinations of these compounds may also be used to affect the reaction.

Non-limiting examples of the aprotic polar solvent include N,N-dimethylformamide (DMF), N,N-diethylformamide, N,N-dimethylacetamide, N,N-diethylacetamide, N,N-dipropylacetamide, N,N-dimethylbenzamide, N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethylsulfoxide (DMSO), diethylsulfoxide, sulfolane, 1-methyl-1-oxosulfolane, 1-ethyl-1-oxosulfolane, 1-phenyl-1-oxosulfolane, N,N'-dimethylimidazolidinone (DMI), diphenylsulfone, and combinations thereof. The amount of solvent to be used is typically an amount that is sufficient to dissolve the aromatic dihalo and the aromatic dihydroxy compounds.

The polymerization reaction is conducted at a temperature ranging from about 100° C. to about 250° C. in certain embodiments, from about 140° C. to about 200° C. in certain embodiments, from about 150° C. to about 175° C., and from about 155° C. to about 165° C. in certain embodiments. The reaction mixture may be further dried by adding to the initial reaction mixture, along with the polar aprotic solvent, an azeotrope-forming solvent that forms an azeotrope with water. After removal of residual water by azeotropic drying, the reaction may be carried out at the elevated temperatures described above. The reaction is typically conducted for a period ranging from about 1 hour to about 48 hours in certain embodiments, and from about 1 hour to about 24 hours in certain embodiments.

After completion of the reaction, the copolymer, for example, the terpolymer, may be separated from the inorganic salts, precipitated into a non-solvent and collected by filtration and drying. Non-limiting examples of non-solvents include water, methanol, ethanol, propanol, butanol, acetone, methyl ethyl ketone, methyl isobutyl ketone, or any combinations thereof.

The glass transition temperature, $T_g$, of the copolymer, for example, the terpolymer, may be in a range from about 140° C. to about 280° C. in one embodiment, and may be in a range from about 140° C. to about 200° C. in another embodiment.

The copolymer, for example, the terpolymer, and the membrane fabricated from the terpolymer may be further characterized by its hydrophilicity. In certain embodiments, the terpolymer has a contact angle with water less than about 80 degrees measured on a surface of the terpolymer cast as a film on a glass substrate. In certain embodiments, the terpolymer has a contact angle with water less than about 50 degrees measured on a surface of the terpolymer cast as a film on a glass substrate. In certain embodiments, the terpolymer has a contact angle with water less than about 30 degrees measured on a surface of the terpolymer cast as a film on a glass substrate.

The membrane may have a hollow fiber configuration or a flat sheet configuration. In certain embodiments, a hollow fiber membrane comprising a terpolymer according to embodiments of the present disclosure, is provided. In certain embodiments, a hollow-fiber membrane module including a plurality of hollow-fiber membranes is presented. In certain embodiments, an apparatus comprising a hollow fiber module comprising a plurality of membranes is provided, where each membrane is a hollow fiber membrane.

The membranes according to embodiments of the present disclosure may be made by processes known in the art. Suitable techniques include, but are not limited to, dry-phase separation membrane formation process; wet-phase separation membrane formation process; dry-wet phase separation membrane formation process; thermally-induced phase-separation membrane formation process; or any combinations thereof. Further, post membrane-formation, the membrane may be subjected to a membrane conditioning process or a treatment process prior to its use in a separation application. Representative processes may include thermal annealing to relieve stresses or pre-equilibration in a solution similar to the feed stream the membrane will contact.

In certain embodiments, the membranes may be prepared by phase inversion. The phase inversion process includes: 1) vapor-induced phase separation (VIPS), also called "dry casting" or "air casting"; 2) liquid-induced phase separation (LIPS), mostly referred to as "immersion casting" or "wet casting"; 3) thermally induced phase separation (TIPS), frequently called "melt casting"; or any combinations thereof. The phase inversion process may produce integrally skinned asymmetric membranes.

In certain embodiments, a cross-linked copolymer may be prepared to provide additional mechanical, thermal and chemical resistance by reacting a copolymer with a cross-linking agent.

Non-limiting examples of crosslinking agents include 1,2-dichloroethane; 1,3-dichloropropane; 1,4-dichlorobutane; 1,5-dichloropentane; 1,6-dichlorohexane; 1,7-dichloroheptane; 1,8-dichlorooctane; 1,9 dichlorononane; 1,2-dibromoethane; 1,3-dibromopropane; 1,4-dibromobutane; 1,5-dibromopentane; 1,6-dibromohexane; 1,7-dibromoheptane; 1,8-dibromooctane; 1,9 dibromononane; 1,2-diiodoethane; 1,3-diiodopropane; 1,4-diiodobutane; 1,5-diiodopentane; 1,6-diiodohexane; 1,7-diiodoheptane; 1,8-diiodooctane; 1,9 diiodononane; 1,1,2-trichloroethane; 1,1,3-trichloropropane; 1,1,4-trichlorobutane; 1,1,5-trichloropentane; 1,1,6-trichlorohexane; 1,1,7-trichloroheptane; 1,1,8-trichlorooctane; 1,1,9 trichlononane; 1,1,2-tribromoethane; 1,1,3-tribromopropane; 1,1,4-tribromobutane; 1,1,5-tribromopentane; 1,1,6-tribromohexane; 1,1,7-tribromoheptane; 1,1,8-tribromooctane; 1,1,9 tribromononane; 1,1,2-triiodoethane; 1,1,3-triiodopropane; 1,1,4-triiodobutane; 1,1,5-triiodopentane; 1,1,6-triiodohexane; 1,1,7-triiodoheptane; 1,1,8-triiodooctane; 1,1,9 triiodononane; 1,1,2,2-tetrachloroethane; 1,1,3,3-tetrachloropropane; 1,1,4,4-tetrachlorobutane; 1,1,5,5-tetrachloropentane; 1,1,6,6-tetrachlorohexane; 1,1,7,7-tetrachloroheptane; 1,1,8,8-tetrachlorooctane; 1,1,9,9-tetrachlorononane; 1,1,2,2-tetrabromoethane; 1,1,3,3-tetrabromopropane; 1,1,4,4-tetrabromobutane; 1,1,5,5-tetrabromopentane; 1,1,6,6-tetrabromohexane; 1,1,7,7-tetrabromoheptane; 1,1,8,8-tetrabromooctane; 1,1,9,9-tetrabromononane; 1,1,2,2-tetraiodoethane; 1,1,3,3-tetraiodopropane; 1,1,4,4-tetraiodobutane; 1,1,5,5-tetraiodopentane; 1,1,6,6-tetraiodohexane; 1,1,7,7-tetraiodoheptane; 1,1,8,8-tetraiodooctane; 1,1,9,9-tetraiodononane; 2,2'-dimethyl-1,3-dibromopropane; 2-methyl-2-bromomethyl-1,3-dibromopropane; 2,2'-dibromomethyl-1,3-dibromopropane.

The membranes comprising multicomponent copolymers may be cross-linked to provide additional mechanical, thermal and chemical resistance by reacting the copolymer with one of the crosslinking agents described above. Also other crosslinking agents capable of reacting with piperazine nitrogens may be used, e.g. epoxide crosslinkers including, but not limited to, epichlorohydrin, epibromohydrin, ethylene glycol diglycidyl ether, butylene glycol diglycidyl ether, glycerol di- or tri-glycidyl ether, pentaerythritol di-, tri- or tetraglycidyl ether, bisphenol A diglycidyl ether etc, or PEG diglycidyl ether etc.

In one embodiment, a method of forming a cross-linked polymer includes: providing a multicomponent copolymer; and crosslinking a piperazine group of the at least one repeat unit AC with a cross-linking agent.

The cross-linking agent comprises at least two reactive groups. In certain embodiments, the crosslinking agent is a haloalkane selected from a group consisting of a dihaloalkane, a trihaloalkane, a tetrahaloalkane, and any combinations thereof. In certain embodiments, the haloalkane includes chloro, bromo, iodo group, or any combinations thereof. In certain embodiments, a number of carbon atoms of the haloalkane ranges from 1 to 12. In certain embodiments, the crosslinking agent is 1,6-dibromohexane.

In certain embodiments, the cross-linked copolymer may be blended with a second polymer to impart different properties such as better heat resistance, biocompatibility, and the like. The second polymer includes at least one repeat unit having a structure (III) or structure (V), or combinations thereof:

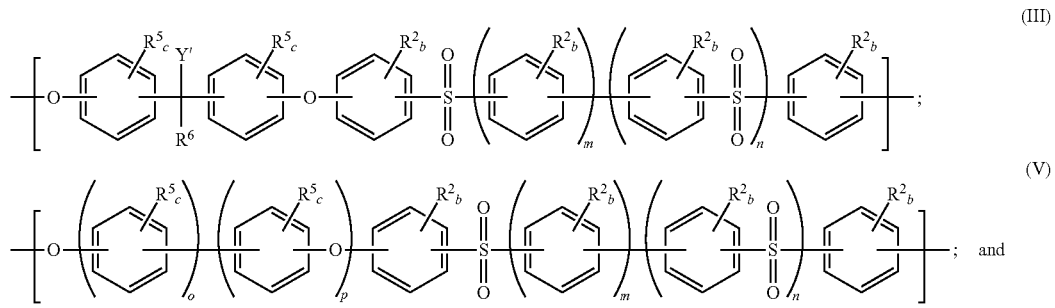

wherein "b" and "c" are independently at each occurrence 1, 2, 3, or 4;

"o", "p", "m" and "n" are each, independently, 0 or 1; and $R^2$ and $R^5$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical, and $R^6$ and $Y'$ are each, independently, a hydrogen atom, a $C_1$-$C_{12}$ aliphatic radical, a $C_3$-$C_{12}$ cycloaliphatic radical, or a $C_3$-$C_{12}$ aromatic radical.

In certain embodiments, the second polymer used in forming a polymer blend with either a multicomponent copolymer or a cross-linked copolymer is in an amount from about 0.5 weight percent to about 5 weight percent of the total weight of the polymer blend.

The membranes may be designed and fabricated to have specific pore sizes so that solutes or particles having sizes greater than the pore sizes may not be able to pass through. In certain embodiments, the pore size may range from about 0.5 nanometers (nm) to about 1000 nanometers. In certain embodiments, the pore size may range from about 0.5 nanometers to about 100 nanometers. In certain embodiments, the pore size may range from about 1 nanometer to about 25 nanometers.

A method of forming a hollow-fiber membrane is also provided. The method includes providing a casting solution comprising the copolymer as described earlier and a solvent. The method further includes extruding the casting solution through an annular channel to form the hollow-fiber membrane. In certain embodiments, an (aqueous) bore liquid may be added to the inside of the annular channel and the extruded hollow fiber may be fed into an (aqueous) coagulation bath, with or without an air gap between the annular channel and a surface of the bath. Non-limiting examples of suitable solvents include N-methyl-2-pyrrolidone, dimethylacetamide, dimethylformamide, tetrahydrofuran, methyl ethyl ketone, formylpiperidine, or any combinations thereof.

In certain embodiments, the casting solution may further include an additive. The additive may include a polymer including, but not limited to, polyvinylpyrrolidone and/or polyethylene glycol. In certain embodiments, the additive may include anti-solvents including, but not limited to, water, alcohols, glycols, glycol ethers, and salts; alkali metal halides; or any combinations thereof. In certain embodiments, the additive may include an alkali metal bromide including, but not limited to, lithium bromide, sodium bromide, potassium bromide, cesium bromide, or any combinations thereof.

The copolymer may be present in the casting solution in an amount ranging from about 10 weight percent to about 30 weight percent, in some embodiments. In certain embodiments, the additive may be present in the casting solution in an amount (that is, total amount of all additives present) ranging from about 0.1 weight percent to about 30 weight percent.

In certain embodiments, the hollow fiber membrane or flat sheet membrane may include a blend of copolymers, for example, a terpolymer as described earlier, and at least one additional polymer to impart different properties such as better heat resistance, biocompatibility, and the like. Furthermore, the additional polymer may be added to the terpolymer during the membrane formation to modify the morphology of the phase inverted membrane structure produced upon phase inversion, such as asymmetric membrane structures. In addition, the at least one polymer blended with the terpolymer may be hydrophilic or hydrophobic in nature.

In certain embodiments, the terpolymer is blended with a hydrophilic polymer. Non-limiting examples of a suitable hydrophilic polymer includes polyvinylpyrrolidone (PVP). Non-limiting examples of other suitable hydrophilic polymers include polyoxazoline, polyethyleneglycol, polypropylene glycol, polyglycolmonoester, copolymer of polyethyleneglycol with polypropylene glycol, water-soluble cellulose derivative, polysorbate, polyethylene-polypropylene oxide copolymer, polyethyleneimine, or any combinations thereof. In certain embodiments, the terpolymer may be further blended with polymers including, but not limited to, polysulfone, polyether sulfone, polyether urethane, polyamide, polyether-amide, polyacrylonitrile, or any combinations thereof.

In certain embodiments, a second polymer comprises at least one repeat unit having a structure (V):

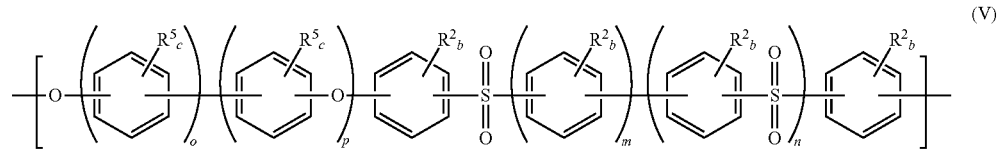

wherein "b" and "c" are independently at each occurrence 1, 2, 3, or 4;

"o", "p", "m" and "n" are each, independently, 0 or 1; and $R^2$ and $R^5$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical.

In certain embodiments, a second polymer comprises at least one repeat unit having a structure (V) wherein o is 1, p is 0, m is 0 and n is 0.

In certain embodiments, a second polymer comprises at least one repeat unit having a structure (V) wherein o is 1, p is 1, m is 0 and n is 0.

In certain embodiments, a second polymer comprises at least one repeat unit having a structure (V) wherein o is 0, p is 0, m is 0 and n is 0.

In certain embodiments, a second polymer comprises at least one repeat unit having a structure (III):

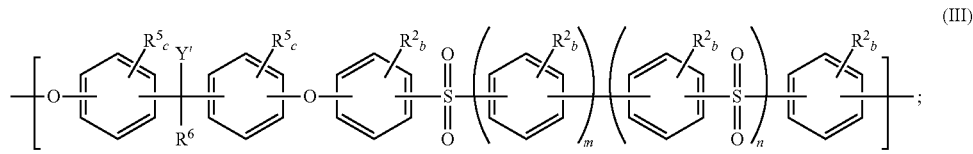

(III)

wherein "b" and "c" are independently at each occurrence 1, 2, 3, or 4;

"m" and "n" are each, independently, 0 or 1; and $R^2$ and $R^5$ are independently at each occurrence a hydrogen atom, a halogen atom, a nitro group, a $C_1$-$C_{12}$ aliphatic radical, a $C_3$-$C_{12}$ cycloaliphatic radical, or a $C_3$-$C_{12}$ aromatic radical, and $R^6$ and Y' are each, independently, a hydrogen atom, a $C_1$-$C_{12}$ aliphatic radical, a $C_3$-$C_{12}$ cycloaliphatic radical, or a $C_3$-$C_{12}$ aromatic radical.

In a preferred embodiment, a second polymer comprises at least one repeat unit having a structure (IIIb) wherein both "b" and "c" are 4; and $R^2$ and $R^5$ are both a hydrogen atom.

The membranes according to certain embodiments of the present disclosure may be used in various applications including, but not limited to, microfiltration, ultrafiltration, nanofiltration and reverse osmosis for drinking water, food and beverage, microelectronics, and purification, treatment and reuse of industrial and municipal wastewater, gas separation, recovery of organic vapors such as petro-chemical vapor recovery using pervaporation, fluid management and bioseparation in the biopharmaceutical industry, hemodialysis, fuel cell, battery separators, or electrolysis for chlorine production, or any combinations thereof.

In certain embodiments, a hollow-fiber membrane for bio-separation is provided. A hollow-fiber membrane suitable for bio-separation may be characterized in part by a protein binding property. In certain embodiments, the hollow-fiber membranes may have protein binding (e.g. monoclonal IgG antibody) less than about 20 ng/cm². The membrane is fabricated from a terpolymer according to embodiments of the present disclosure. In certain embodiments, a bio-separation apparatus is provided; the apparatus includes a hollow fiber module including a plurality of membranes according to embodiments of the present disclosure.

The membranes according to embodiments of the present disclosure may be used for hemodialysis. Dialysis refers to a process effected by two or more membranes in which transport is driven primarily by pressure differences across the thickness of the two or more membranes. Hemodialysis refers to a dialysis process in which biologically undesired and/or toxic solutes, such as metabolites and by-products are removed from blood. Hemodialysis membranes are porous membranes permitting the passage of low molecular weight solutes, typically less than 5,000 Daltons (Da), such as urea, creatinine, uric acid, electrolytes and water, yet preventing the passage of higher molecular weight proteins and blood cellular elements. Hemofiltration, which more closely represents the filtration in the glomerulus of the kidney, requires even more permeable membranes allowing complete passage of solutes of molecular weight of less than 50,000 g/mol, and, in some cases, less than 20,000 g/mol.

The multicomponent copolymers according to certain embodiments of the present disclosure have the desired mechanical properties to support the porous membrane structure during manufacture and use. In addition, the copolymers have adequate thermal properties so as not to degrade during high temperature steam sterilization processes. Further, the copolymers and the corresponding membranes have optimal biocompatibility, such that protein fouling is minimized and thrombosis of the treated blood does not occur.

EXAMPLES

Chemicals were purchased from Aldrich and Sloss Industries and used as received, unless otherwise noted. NMR spectra were recorded on a Bruker Avance 400 ($^1$H, 400 MHz) spectrometer and referenced versus residual solvent shifts. Molecular weights are reported as number average ($M_n$) or weight average ($M_w$) molecular weight and were determined by gel permeation chromatography (GPC) analysis on a Perkin Elmer Series 200 instrument equipped with UV detector. Polymer thermal analysis was performed on a Perkin Elmer DSC7 equipped with a TAC7/DX thermal analyzer and processed using Pyris Software.

Glass transition temperatures were recorded on the second heating scan. Contact angle measurements were taken on a VCA 2000 (Advanced Surface Technology, Inc.) instrument using VCA optima Software for evaluation. Polymer films were obtained from casting a thin film from an appropriate solution, such as, dimethyl sulfoxide (DMSO), N-methyl-2-pyrrolidone (NMP), and dimethylacetamide (DMAC) onto a clean glass slide and evaporation of the solvent. Advancing contact angles with water (73 Dynes/cm) were determined on both sides of the film (facing air and facing glass slide). Consistently lower values were obtained on the side facing the glass slide presumably due to the smoother surface.

Scheme 1 is a non-limiting example of the synthesis route for random copolymers having zwitterion content. Either a one-pot or a two-pot synthesis can be used.

Scheme 1
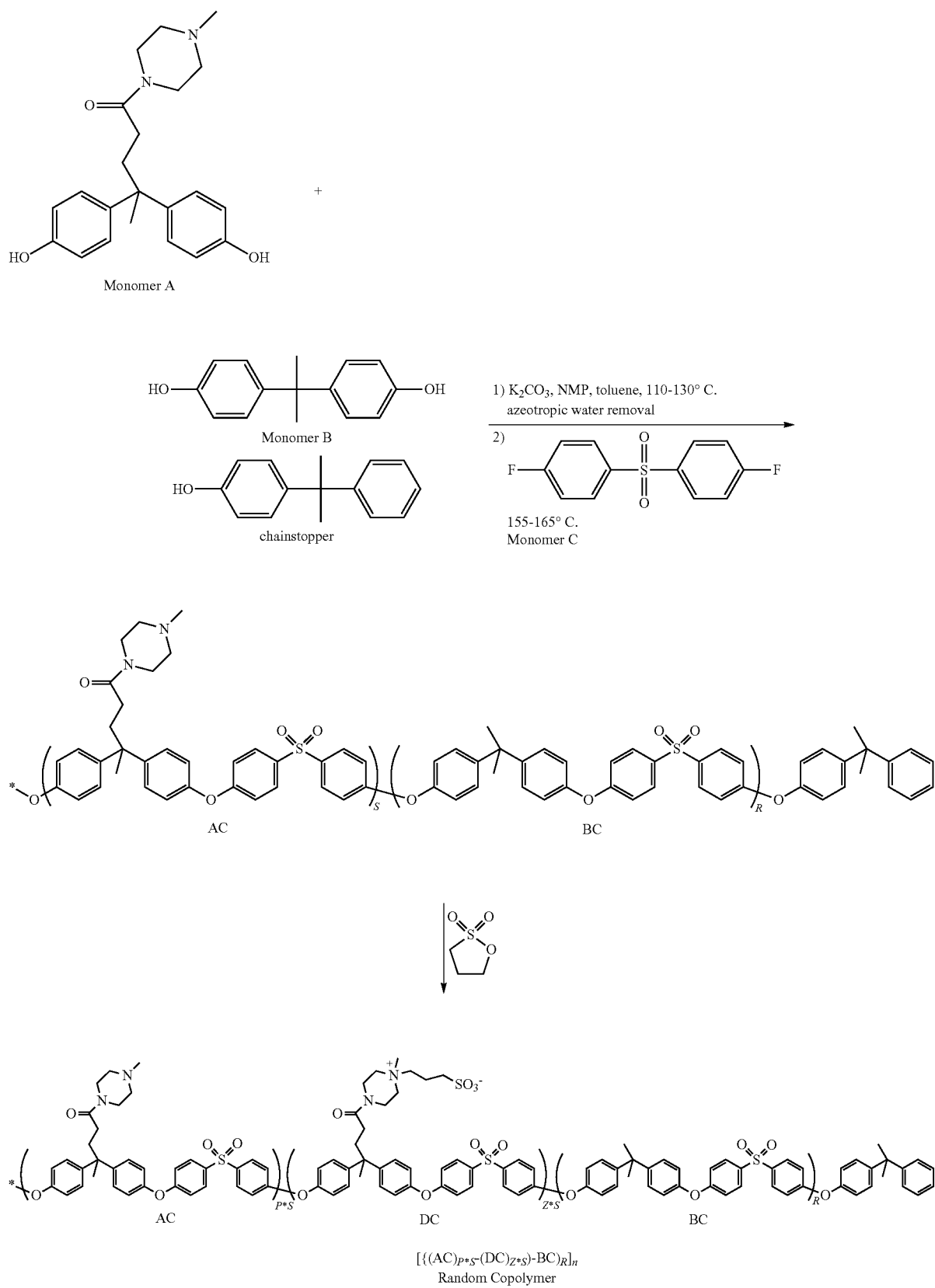

Example 1: Synthesis of a Multicomponent Copolymer Having Zwitterion Content (One-Pot Synthesis)

To a 5.0 L three neck flask immersed in an oil bath, and equipped with an overhead mechanical stirrer, shorthead distillation apparatus, and a nitrogen inlet, 4'-isopropylidenediphenol (bisphenol-A or BPA, 228.1 g, 1 mole), N-methyl piperazine diphenolamide (301.17 g, 0.8182 moles), p-cumyl phenol (12.468 g, 0.0591 moles), and 1.60 L of N-methyl pyrrolidinone (NMP) were charged. This mixture was stirred at room temperature followed by addition of potassium carbonate (401.5 g, 2.909 moles) in portions, which was followed by addition of 0.8 L of toluene. This mixture was heated under a slow stream of nitrogen to remove toluene and azeotrope residual water to dry reaction mixture. The oil bath temperature was gradually raised from 125-150° C. to obtain a slurry of substantially dried reaction mixture (>90% toluene removed). The slurry was cooled to room temperature. Difluorodiphenyl sulfone (DFDPS, 469.63 g, 1.8482 moles) was added to the slurry and the reaction temperature was gradually raised to 165° C. During the heat, a mild exotherm was observed at about 100° C. The mixture was heated and samples taken every two hours until desired molecular weight was achieved (about 8-10 hours). The reaction viscosity increased over the course of the run with the reaction product having an opaque greyish color. When the desired molecular weight was achieved, the reaction was diluted with 0.8 liters of NMP and cooled to 50° C. 1,3-propane sultone was added (149.7 g, 1.227 moles) and the reaction mixture gradually heated to 80° C. The reaction was complete in about 4 hours. Based on the solution viscosity the reaction mixture was further diluted. The mixture was precipitated into 12.0 L of water using a high speed blender, producing a white precipitate. The precipitate was collected by filtration, and re-slurried in 5.0 liters of warm water (about 40-50° C.) for 6 hours. The solid was collected by filtration. The resulting polymer was dried under vacuum initially at 50° C. under a purge of nitrogen for 24 hours, and an additional 24 hours at 80-100° C. under full vacuum. 950 grams of the copolymer was obtained after drying (95% recovery).

Example 2: Synthesis of a Multicomponent Copolymer Having Zwitterion Content Via a Two-Pot Synthesis Copolymer of Bisphenol-A and N-Methyl Piperazino Diphenolamide Polysulfone: A 250 ml three neck round bottom flask equipped with an overhead mechanical stirrer and distillation head to remove water/toluene azeotrope mixture was charged with bisphenol-A (7.434 g, 0.0326 moles), N-methyl piperazino diphenolamide (12.000 g, 0.0326 moles), p-cumyl phenol (0.069 g, 0.000326 moles), anhydrous potassium carbonate (18.340 g, 0.133 moles), 75 mL of N-methyl pyrrolidinone (NMP), and 75 mL of toluene. This mixture was heated to remove water by azeotropic distillation of toluene starting at about 120° C. and increasing temperature to 150° C. as most of toluene is removed under a stream of nitrogen. The toluene distillation was complete in about 6 hours with >75% recovery of toluene and no visible sign of water in collected distillate. The reaction mixture was cooled and cooled to room temperature. At room temperature, difluorodiphenyl sulfone (16.560 g, 0.0652 moles) was added as a solid. Then the reaction mixture was heated to 155° C. until the mixture became very viscous, building sufficient molecular weight. The solution was cooled, precipitated into water and slurried in methanol for 1 hour, the resulting material was collected by filtration and dried in vacuum oven overnight at room temperature, followed by continued drying at 80° C. for an additional 24 hrs. 24 grams off an off-white solid was recovered.

Zwitterionic Copolymer of Bisphenol-A and N-Methyl Piperazino Diphenolamide Polysulfone: Ten grams of copolymer prepared above (0.0195 moles of amine) was dissolved into 40 mL of NMP. 1,3-Propane sultone (2.38 g, 0.0195 moles) was added and solution heated to 80° C. for 4 hours, the reaction mixture became very thick. The solution was cooled to room temperature and precipitated into water to obtain an off white solid. The solid was dried overnight at room temperature and an additional 24 hours at 80° C. to provide 10 grams of an off white solid. The glass transition temperature (Tg) was 242° C.

Scheme 2 shows an example of synthesis route for making block copolymers with a formula $[(AC)_{P*S}\text{-}(DC)_{Z*S}\text{-}(BC)_R]_N$, according to embodiments of the present disclosure.

Scheme 2

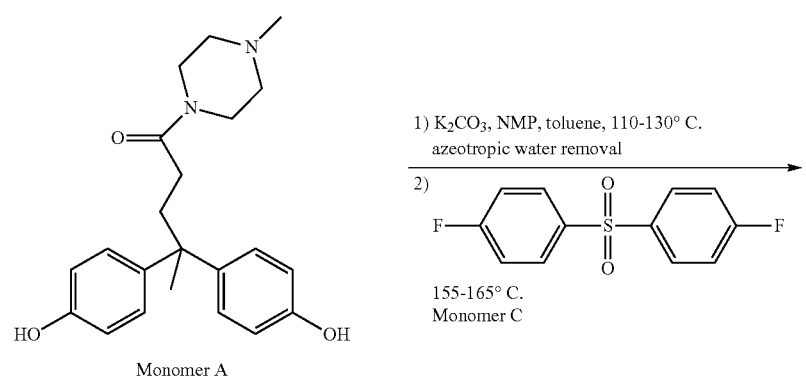

Monomer A

1) $K_2CO_3$, NMP, toluene, 110-130° C.
   azeotropic water removal 2) 155-165° C.
   Monomer C -continued

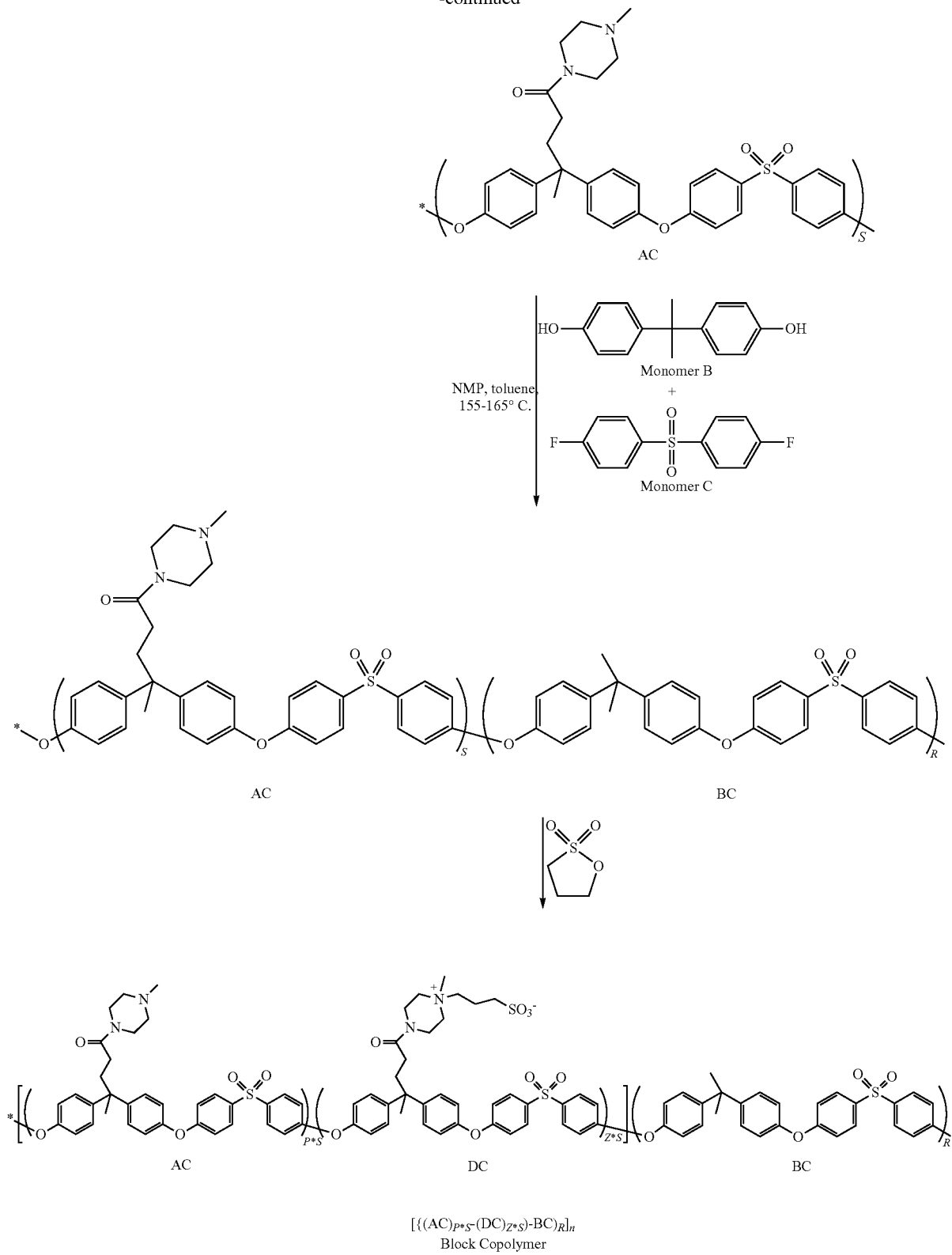

[{(AC)_{P*S}-(DC)_{Z*S}-BC)_R]_n
Block Copolymer

Piperazine and zwitterion contents of the resulting copolymers were measured using $^1$H NMR with DMSO-$d_6$ as a NMR solvent. Approximately 0.1 gram of material was dissolved in 1.5 mL of DMSO-$d_6$. This solution was filtered using 0.4 1am filter cartridges prior to running the NMR sample. Other techniques known to one skilled in the art may also be used to characterize piperazine and zwitterion contents.

Example 3: Fabrication of Hollow-Fiber Membranes

A solution containing 23 weight percent (wt %) of a copolymer of the formula $[(AC)_{P*S}\text{-}(DC)_{Z*S}\text{-}(BC)_R]_N$ (as described in Example 1), 24 wt % polyvinylpyrrolidone, 3 wt % lithium bromide, and 50 wt % N-methylpyrrolidone was extruded through an annular nozzle into a coagulation bath containing water. The annulus bore included an inner coagulating fluid (a mixture of solvents and non-solvents) and a second, outer coagulation fluid was applied outside the annulus, forming a sheath around the freshly extruded polymer dope. The fiber was extruded through the bath at a rate of about 3-60 meter/min, and was collected in a second bath for further extraction.

Example 4: Protein Adhesion Studies

Films cast using zwitterion-functionalized terpolymers were evaluated for protein binding. Dense films were blocked so that only the top surface (that which was exposed to air when the film was cast) was exposed to a model foulant, an HRP-labeled antibody (HRP-Ab). The surfaces were exposed with a 10 jag/ml solution of HRP-Ab for 2 hours and washed thoroughly with PBS for another hour to remove loosely-adhered HRP-Ab. Using a 0.5 cm diameter biopsy punch, disks were cut from the film and 3 disks from each polymer film were transferred individually to a 24-well plate. To each well was added 0.5 ml of a solution of o-phenylene diamine, hydrogen peroxide, and citrate phosphate buffer (0.5 mg/ml, 0.015%, and 50 mM, respectively). Three minutes after this solution was added, the absorbance of the solution was measured at 450 nm. The HRP enzyme on the HRP-Ab converts the o-phenylene diamine to a colored product, and thus the absorbance of the solution can be correlated to the amount of HRP-Ab that has fouled the surface of the dense film using a calibration curve. When this method is used to determine the fouling on hollow fibers, 1-inch long pieces of hollow fiber are submerged in the HRP-Ab solution for 2 hours, washed thoroughly with PBS for an additional hour, cut into quarters and the 4 quarters are transferred collectively to the wells of a 24-well plate. The enzymatic reaction and spectrophotometry are carried out as described above. Inner and outer diameter of each fiber were measured microscopically and used to calculate nominal surface area of the sample. Surface coverage was normalized by surface area.

FIG. 1 shows effects of zwitterion content on protein fouling, as shown by the normalized protein binding performance (normalized with respect to a commercial polysulfone (PSU)) of membranes fabricated from a zwitterion-containing multicomponent copolymer according to embodiments of the present disclosure. Tunable protein fouling properties of copolymers and/or membranes can be achieved. As illustrated in FIG. 1, increasing the mole fraction of the zwitterion content in the copolymer (e.g. Z*S) leads to decreased protein binding (e.g. IgG binding relative to a comparative example of a commercial PSU).

Thus, one skilled in the art, in developing membranes with low protein fouling properties, would expect that polymers with a higher mole fraction of the zwitterion content is more desirable, preferably higher than 0.5. However, the inventors have discovered that, unexpectedly, polymers with a high mole fraction of the zwitterion content, for example, in certain embodiments, for copolymers with a mole fraction of the zwitterion content higher than about 0.6 undesired properties in other areas such as solubility and/or processibility have been observed.

Table 1 illustrates comparison of solubility properties of zwitterion-containing copolymers with a formula $[(AC)_{P*S}\text{-}(DC)_{Z*S}\text{-}(BC)_R]_N$ (Examples 1A-1G) and various zwitterion contents (Z*S) ranging from about 0.10 to about 0.58. As shown, the copolymer with a mole fraction of the zwitterion content (Z*S) of about 0.58 become a gel unsuitable in NMP solvent for further processing (e.g. sample IC)). In certain embodiments, targeting a mole fraction of the zwitterion content of 1.0 may leads to an insoluble gel (e.g. sample 1D). The non-limiting examples of Table 1 illustrate that, while low properties such as protein fouling may be controlled by the zwitterion contents in the copolymers, challenges and unmet needs remain in developing multicomponent copolymers and associated membranes in which other desirable properties (e.g. solubility/processibility) may be adjustably controlled including, but not limited to, solubility/processibility properties, molecular weight and mechanical properties.

TABLE 1

| Sample No. | Total Piperazine content (mole fraction, S) | DC mole fraction, (zwitterion content, Z*S) [a] | AC mole fraction (P*S) [a] | BC mole fraction (R) [a] | Solubility testing results |
|---|---|---|---|---|---|
| 1A | 0.25 | 0.10 | 0.15 | 0.75 | Soluble (>15 wt % in NMP) |
| 1B | 0.50 | 0.44 | 0.06 | 0.50 | Soluble (>15 wt % in NMP) |
| 1C | 0.75 | 0.58 | 0.17 | 0.25 | Gel at 15 wt % in NMP |
| 1D | 1.0 [c] | nd [b] | nd [b] | 0.0 | Insoluble gel |
| 1E | 0.50 | 0.49 | 0.01 | 0.50 | Soluble (>15 wt % in NMP |
| 1F | 0.50 | 0.35 | 0.15 | 0.50 | 230 gram scale; Soluble (>15 wt % in NMP) |
| 1G | 0.50 | 0.45 | 0.05 | 0.50 | 10 kg scale; Soluble (>15 wt % in NMP) |

[a] Determined by $^1$H-NMR in DMSO-$d_6$
[b] Not determined due to formation of an insoluble gel
[c] Targeted value. actual value not determined due to formation of an insoluble gel Samples 1A-1G were synthesized using the one-pot synthesis approach illustrated in Scheme 1 but other methods including the two-pot synthesis method has also been used to obtain the samples.

The inventors have further discovered, surprisingly, while the protein fouling properties may be adjustably controlled or tuned by varying a mole fraction of the zwitterion content in the copolymer, the total content of piperazine and the free piperazine content in the copolymer(s) do not play a significant role in impacting the protein fouling properties. This discovery leads to current development of alternative polymers having two or more tunable properties. Non-limiting examples of the tunable properties include improved protein fouling, processibility, mechanical properties, or any combinations thereof.

Figure 2:
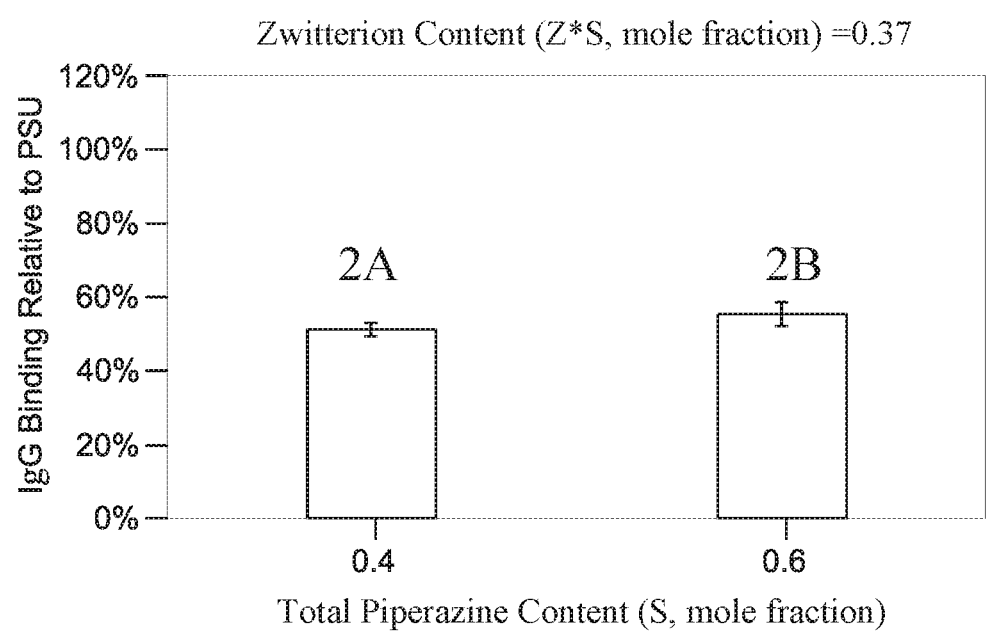
FIG. 2 illustrates that protein fouling properties are mainly controlled by the zwitterion content, according to embodiments of the present disclosure.

In FIG. 2, shown as a non-limiting example, a terpolymer (FIG. 2, sample A, left) having a formula of $[(AC)_{P*S}\text{-}(DC)_{Z*S}\text{-}(BC)_R]_N$, where mole fractions of a total piperazine content (S), a free piperazine content (P*S), a zwitterion content (Z*S) and a polysulfone unit (R) are 0.4, 0.03, 0.37, and 0.6, respectively, has a comparable protein fouling performance (as shown by comparable IgG binding value in Y-axis) as a terpolymer (FIG. 2, sample B, right) having the same general formula where the mole fractions of S, P*S, Z*S and R are 0.6, 0.23, 0.37 and 0.4, respectively. Thus, protein fouling properties are mainly controlled by a mole fraction of the zwitterion content. in addition, the total content of piperazine and/or the free piperazine content does not play a significant role in impacting the protein fouling properties, as terpolymers samples A and B differ significantly in these values. As such the terpolymers designed to include functional handles, for example, free piperazine groups, may be further functionalized to impart additional properties to the polymers. For example, the free piperazine groups may be further cross-linked to provide additional properties such as improved mechanical stability and processibility, as described in more detail later. In certain embodiments of the present disclosure, the free piperazine content of the multicomponent copolymers are adjustably controlled.

Figure 3:
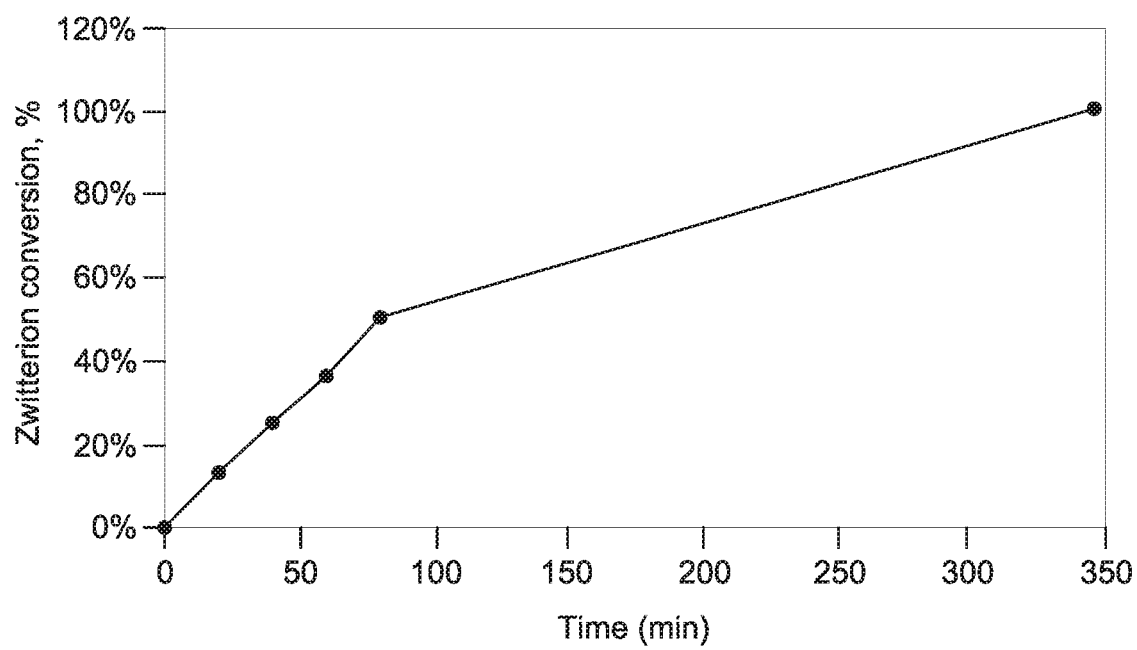
FIG. 3 shows the conversion of the piperazine content to piperazine-zwitterion functionality over the reaction time, according to embodiments of the present disclosure.

FIG. 3 illustrates conversion of free piperazine-containing repeat units (AC) to zwitterion-containing repeat units (DC) through a reaction with a sultone (e.g. 1,3-propanesultone) over time. Factors that may be used to adjustably control free piperazine content of the formed copolymers include, but not limited to, stoichiometry of the monomers (e.g. bisphenol-A, difluorodiphenyl sulfone (DFDPS)), polymerization reaction time, molar equivalents of the sultone, base, temperature, among others.

Figure 4:
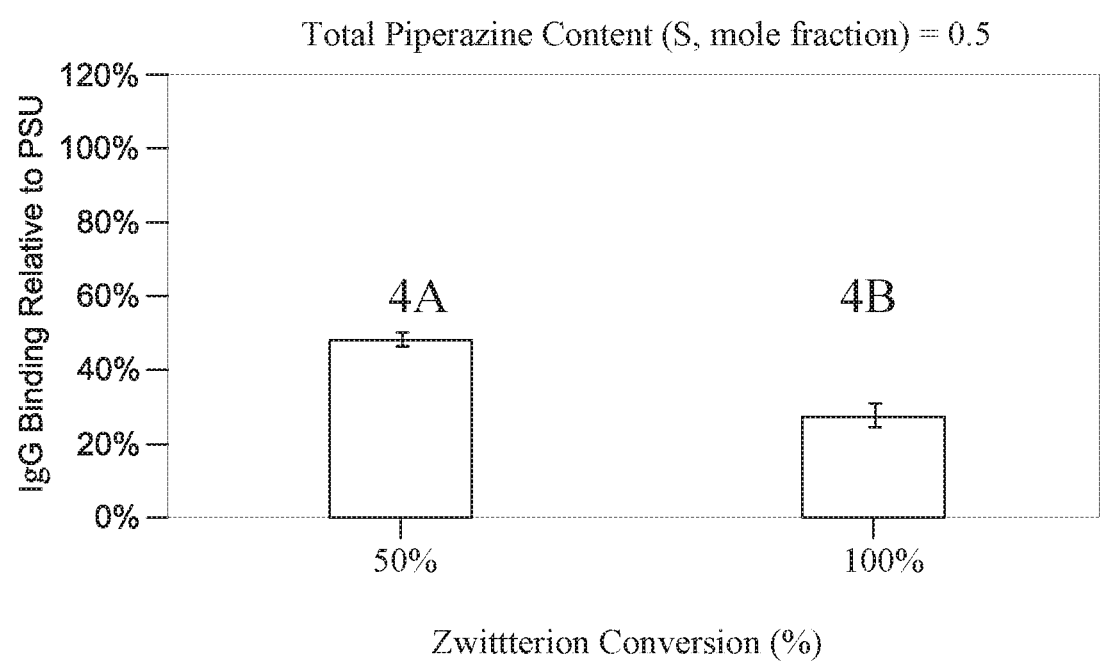
FIG. 4 shows the effects of total piperazine content and fixed zwitterion content on protein fouling, according to embodiments of the present disclosure.

FIG. 4 shows the effects of total piperazine content and zwitterion content on protein fouling. For example, both copolymers of 4A and 4B with a formula of $[(AC)_{P*S}\text{-}(DC)_{Z*S}\text{-}(BC)_R]_N$ have the same total piperazine content (S, where S=P*S+Z*S=0.5). In 4A, the conversion of the free piperazine content may be controlled to be 50%, yielding a copolymer with a zwitterion content of 0.25 (Z*S, mole fraction). In 4B, the conversion of the free piperazine content may be controlled to be 100%, yielding a copolymer with a zwitterion content of 0.5 (Z*S, mole fraction), which has improved protein fouling properties. Therefore, by adjustably controlling mole fraction contents of various building blocks (e.g. repeat units or blocks comprising repeat units) in the copolymer, properties such as protein fouling may be tuned.

By applying the design principles in the present disclosure, additional properties such as improved mechanical properties may be obtained in certain embodiments.

Table 2 provides non-limiting examples in which weight average molecular weight ($M_w$) may be tuned/adjustably controlled for multicomponent copolymers with a formula of $[(AC)_{P*S}\text{-}(DC)_{Z*S}\text{-}(BC)_R]_N$ (Samples 2A-2H).

TABLE 2

Tunable weight average molecular weights ($M_w$) of obtained copolymers with a formula of $[(AC)_{P*S}\text{-}(DC)_{Z*S}\text{-}(BC)_R]_N$

| Sample ID# | Stoichiometry (chain stopper/ DFDPS, mol %) | Mw (kg/mol) of obtained copolymers | AC (mole fraction, P*S)$^a$ | DC (mole fraction, Z*S)$^a$ | BC (mole fraction, R)$^a$ |
|---|---|---|---|---|---|
| 2A | 1.0 | 90.8 | 0.05 | 0.40 | 0.55 |
| 2B | 1.5 | 68.8 | 0.04 | 0.41 | 0.55 |
| 2C | 2.0 | 65.8 | 0.06 | 0.39 | 0.55 |
| 2D | 2.2 | 62.9 | 0.05 | 0.40 | 0.55 |
| 2E | 2.3 | 52.8 | 0.07 | 0.38 | 0.55 |
| 2F | 2.3 | 54.6 | 0.05 | 0.40 | 0.55 |
| 2G | 3.0 | 45.2 | 0.06 | 0.39 | 0.55 |
| 2H | 3.2 | 43.5 | 0.06 | 0.39 | 0.55 |

$^a$Determined by $^1$H-NMR in DMSO-$d_6$

Figure 5:
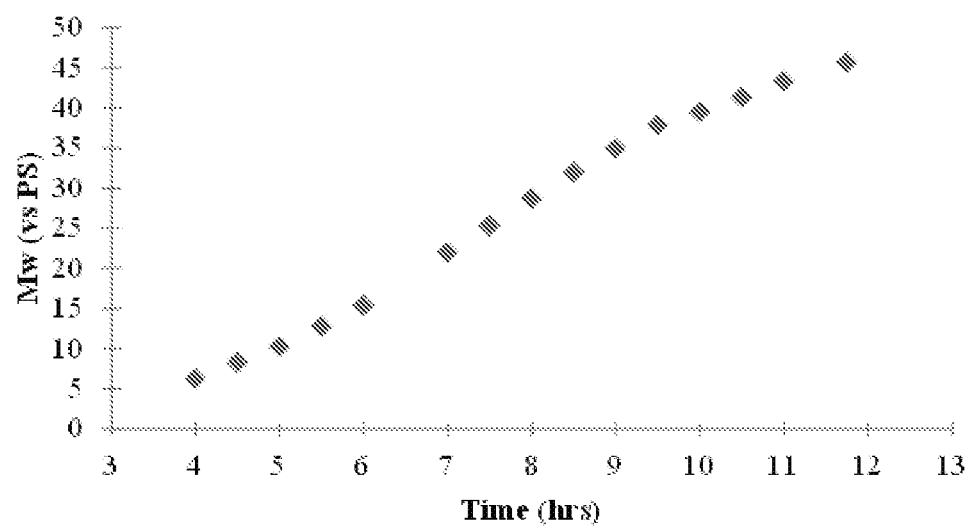
FIG. 5 shows a molecular weight build versus time plot of a multicomponent copolymer at 155° C., according to embodiments of the present disclosure.

Samples 2A-2H were prepared using experimental protocol listed for Example 1 or 2. p-Cumyl phenol was used as a chain stopper in the preparation of samples 2A-2H but other chain stoppers known to one skilled person may be used to achieve the same results. Copolymers with various weight average molecular weight ($M_w$) were obtained by adjustably controlling reaction parameters including, but not limited to, stoichiometry of monomers (e.g. bisphenol-A, difluorodiphenyl sulfone (DFDPS)), relative molar ratio of a chain stopper (e.g. p-cumyl phenol), base, temperature, polymerization reaction time, amount of sultone, among others. In certain embodiments, molecular weight may be controlled by polymerizing an intermediate copolymer (for example, a AC-BC bipolymer) to a target molecular weight and then forming the zwitterion-containing copolymer, either in situ, or in a separate second step, via the addition of a corresponding sultone compound (e.g. 1,3-propanesultone) to the reaction mixture. FIG. 5 illustrates an example of a typical molecular weight build versus time plot of a multicomponent copolymer of the present disclosure at 155° C. (y-axis: weight average molecular weight versus polystyrene standards).

Figure 6:
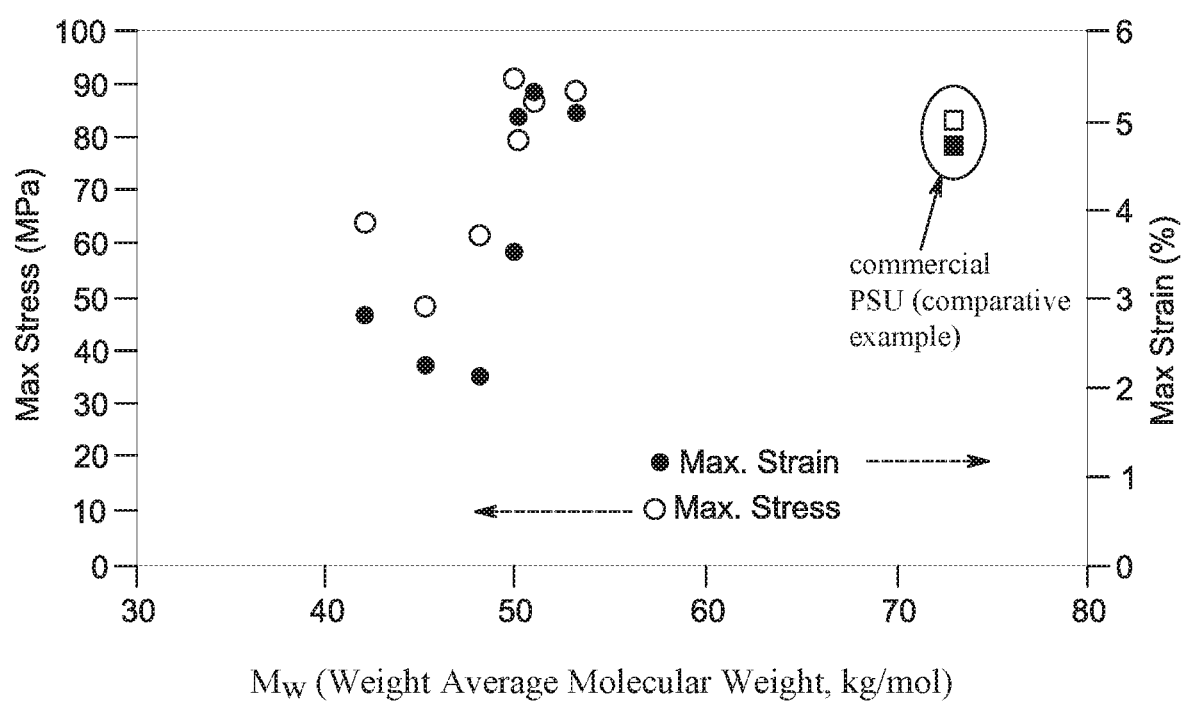
FIG. 6 shows the mechanical testing data of multicomponent copolymers, according to embodiments of the present disclosure.

FIG. 6 shows the mechanical testing data of multicomponent copolymers according to embodiments of the present disclosure. A benchtop Instron testing system is used for mechanical testing, and all tests are conducted at ambient temperature. Maximum stress (in MPa) and maximum strain (%) are obtained from recorded stress-strain curve(s) for each test sample. All test samples are solution cast films with a thickness of about 0.015 inch, which are prepared by dissolving the copolymer in NMP at a 20 weight % concentration, casting on a glass plate with a doctor blade at 40° C., and drying overnight in a vacuum oven at 105° C. and then at 140° C. for additional 24 hours. Strips of polymer specimen with about 0.5 inch width and about 2 inch length are cut form the cast films and used for mechanical testing. A crosshead speed of 0.5 inch/min is used for all mechanical testing. As shown in FIG. 6, improved mechanical properties of the multicomponent copolymers could be achieved by adjustably controlling (for example, increasing) the weight average molecular weight ($M_w$). In certain embodiments, copolymers with $M_w$ ranging from about 50,000 g/mol to about 60,000 g/mol have similar or better mechanical properties than a comparable example of commercial polysulfone (PSU). In addition, as illustrated in Table 2, copolymers with $M_w$ up to about 90,000 g/mol may be obtained, for example, in a range of about 10,000 g/mol to about 90,000 g/mol in certain embodiments.

It is to be understood that copolymers with $M_w$ in various ranges may be selected for their intended applications. Depending on applications, in certain embodiments, it may be preferable to adjustably control the Mw of the multicomponent copolymers to be lower than that of the commercial polysulfone (PSU with Mw in a range of about 70,000 g/mol to about 80,000 g/mol). In certain embodiments, for applications using hollow fiber membranes fabricated from multicomponent copolymers, $M_w$ of the copolymers may be adjustably controlled to be in a range of about 20,000 g/mol to about 90,000 g/mol, in a range of about 40,000 g/mol to about 75,000 g/mol, in a range of about 40,000 g/mol to about 70,000 g/mol, in a range of about 45,000 g/mol to about 70,000 g/mol in certain embodiments, or in a range of about 50,000 g/mol to about 60,000 g/mol in certain preferred embodiments, to provide copolymers with both improved mechanical properties and processability. In certain embodiments, for applications using flat sheet membranes fabricated from the multicomponent copolymers, it may be desirable to adjustably control the Mw of the multicomponent copolymers to be in a range of about 10,000 g/mol to about 90,000 g/mol, in a range of about 20,000 g/mol to about 75,000 g/mol, in a range of about 30,000 g/mol to about 70,000 g/mol, in a range of about 40,000 g/mol to about 60,000 g/mol, or in a range of about 50,000 g/mol to about 60,000 g/mol in certain embodiments, to provide copolymers with both improved mechanical properties and processability.

Figure 7:
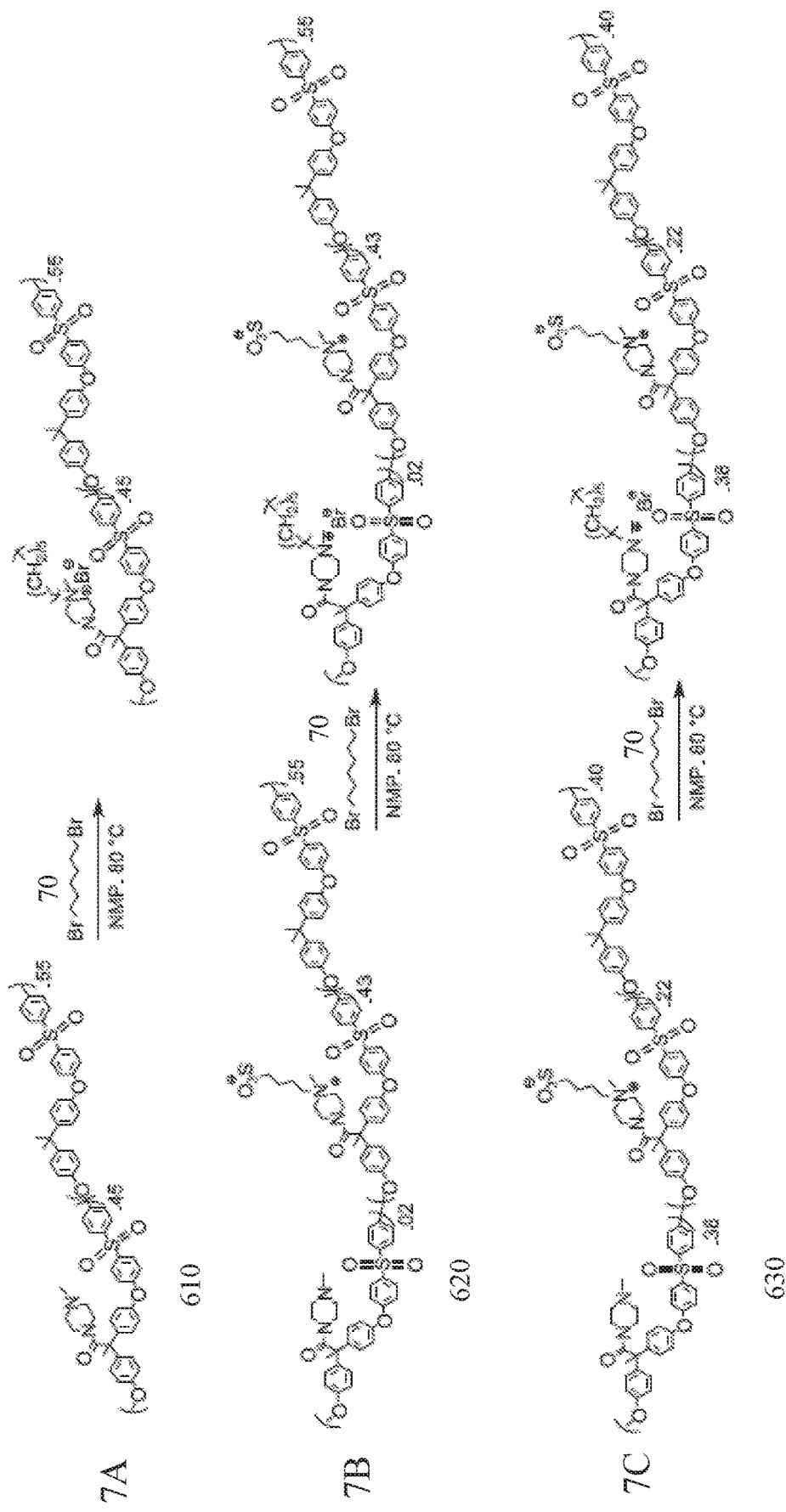
FIG. 7 shows schemes for crosslinking chemistry, according to embodiments of the present disclosure.
Figure 8:
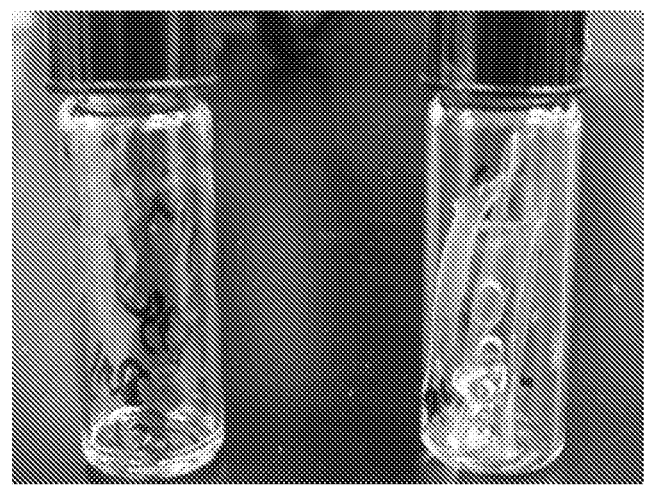
FIG. 8 shows dissolution test results of films formed from various copolymers, according to embodiments of the present disclosure.

FIG. 7 provides non-limiting examples of crosslinking chemistry. FIG. 8 shows representative dissolution test results of films formed from copolymers as provided in FIG. 7A.

In 7A, a bipolymer containing AC and BC blocks 710 with mole fractions of 0.45 and 0.55, respectively ($AC_{0.45}$-$BC_{0.55}$), was dissolved in NMP along with 1,6-dibromohexane 70. The solution was heated to 80° C. whereby the 1,6-dibromohexane reacted with the piperazine moiety of the copolymer. Additionally, solutions with and without 1,6-dibromohexane were cast to from corresponding films and allowed to dry. Once dried, the films were heated to 80° C. and subsequently placed in vials with NMP. The film without 1,6-dibromohexane (film 1) dissolved into the NMP (as shown in FIG. 8, A), while the crosslinked film (film 2) with the 1,6-dibromohexane remained intact (as shown in FIG. 8, B).

In 7B, a terpolymer containing AC, DC and BC blocks 720 with mole fractions of 0.02, 0.43 and 0.55, respectively ($AC_{0.02}$-$DC_{0.43}$-$BC_{0.55}$), was dissolved in NMP along with 1,6-dibromohexane 70. The solution was heated to 80° C. whereby the 1,6-dibromohexane reacted with the piperazine moiety of the copolymer.

In 7C, a copolymer containing AC, DC and BC blocks 730 with mole fractions of 0.38, 0.22 and 0.40, respectively ($AC_{0.38}$-$DC_{0.22}$-$BC_{0.40}$) dissolved into solution with NMP. Solutions with and without 1,6-dibromohexane 70, as well as a solution containing 1,6-dibromohexane and a fluoroalkane (not shown), were cast to form corresponding films and allowed to dry. Once dried, the films were heated to 80° C. and subsequently placed in vials with NMP. The film without 1,6-dibromohexane (film 3) dissolved into the NMP, while the crosslinked film (film 4) with the 1,6-dibromohexane remained intact. The film with the 1,6-dibromohexane and the fluoroalkane (film 5) partially dissolved (dissolution test data of films 3-5 not shown).

The appended claims are intended to claim the present disclosure as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present disclosure. Where necessary, ranges have been supplied; those ranges are inclusive of all sub-ranges there between, and variations in these ranges are construed to be covered by the appended claims. It is also anticipated that advances in science and technology will make equivalents and substitutions possible that are not now contemplated by reasons of the imprecision of language and these variations should also be construed where possible to be covered by the appended claims.

The invention claimed is:

1. A multicomponent copolymer comprising:
at least one repeat unit AC having a structure (I), at least one repeat unit DC having a structure (II), and at least one repeat unit BC having a structure (III):

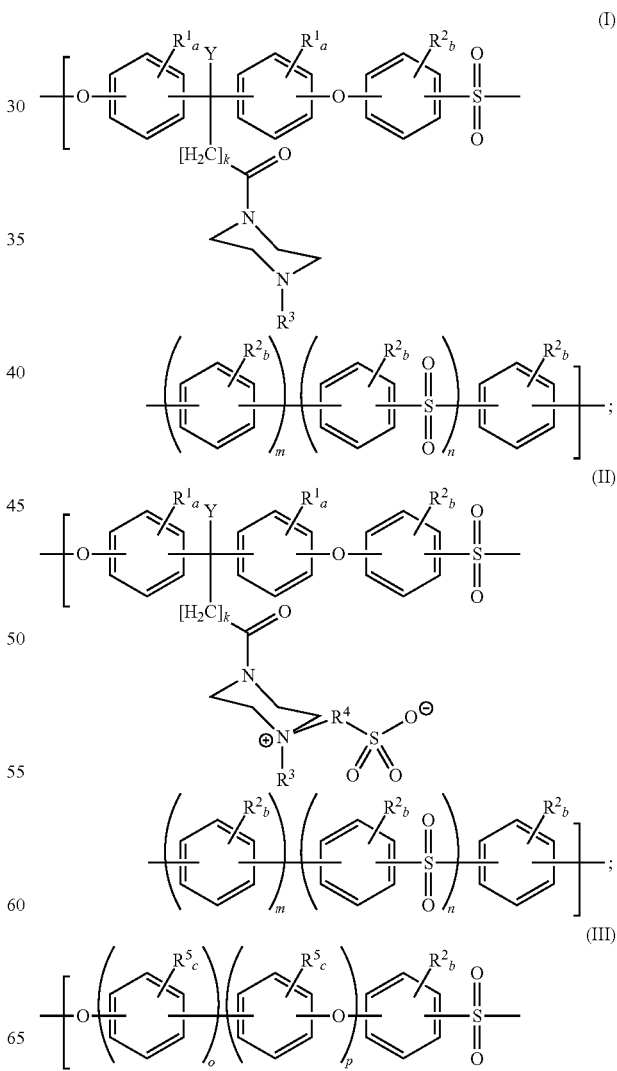

-continued $$\left[\left(\begin{array}{c}R^2_b\\ \end{array}\right)_m\left(\begin{array}{c}R^2_b\\ \overset{O}{\underset{O}{S}}\end{array}\right)_n\left(\begin{array}{c}R^2_b\\ \end{array}\right)\right];$$

wherein "a", "b" and "c" are independently at each occurrence 1, 2, 3, or 4;

"k" ranges from 0 to 10;

"o", "p", "m" and "n" are each, independently, 0 or 1;

$R^1$, $R^2$ and $R^5$ are independently at each occurrence a hydrogen atom, a halogen atom, a nitro group, a $C_3$-$C_{12}$ aliphatic radical, a $C_3$-$C_{12}$ cycloaliphatic radical, or a $C_3$-$C_{12}$ aromatic radical;

$R^3$ and Y are each, independently, a hydrogen atom, a $C_1$-$C_{12}$ aliphatic radical, a $C_3$-$C_{12}$ cycloaliphatic radical, or a $C_3$-$C_{12}$ aromatic radical;

$R^4$ is a bond, a $C_1$-$C_{12}$ aliphatic radical, a $C_3$-$C_{12}$ cycloaliphatic radical, or a $C_3$-$C_{12}$ aromatic radical, and wherein the copolymer has a formula $[(AC)_{P*S}\text{-}(DC)_{Z*S}\text{-}(BC)R]$ wherein S is a mole fraction of a total piperazine content, P*S is a mole fraction of a piperazine content of the repeat units AC, Z*S is a mole fraction of a zwitterion content of the repeat units DC, and R is a mole fraction of the repeat units BC in the copolymer, and wherein P+Z=1, S+R=1, wherein P*S ranges from about 0.01 to about 0.4 and Z*S ranges from about 0.10 to about 0.6.

2. The copolymer of claim 1, wherein the copolymer is a random copolymer comprising randomly distributed sequences of each of the at least one repeat unit AC, BC and DC.

3. The copolymer of claim 1, wherein Z*S ranges from about 0.3 to about 0.5.

4. The copolymer of claim 1, wherein P*S ranges from about 0.01 to about 0.15.

5. The copolymer of claim 1, wherein R ranges from about 0.4 to about 0.75.

6. The copolymer of claim 1, wherein R ranges from about 0.5 to about 0.6.

7. The copolymer of claim 1, wherein the weight average molecular weight ($M_w$) of the copolymer ranges from about 10,000 g/mol to about 90,000 g/mol.

8. The copolymer of claim 1, wherein the weight average molecular weight (Mw) of the copolymer ranges from about 40,000 g/mol to about 75,000 g/mol.

9. The copolymer of claim 1, the at least one repeat unit AC having a structure (I) wherein "k" ranges from 1 to 4; "m" and "n" are both 0; $R^1$, $R^2$, $R^3$ and $R^5$ are independently at each occurrence a hydrogen atom or a $C_1$-$C_4$ aliphatic radical.

10. The copolymer of claim 1, the at least one repeat unit BC having a structure (III) wherein "m" and "n" are both 0; $R^2$, $R^5$, $R^6$ and Y' are independently at each occurrence a hydrogen atom or a $C_1$-$C_4$ aliphatic radical.

11. A membrane comprising:
a multicomponent copolymer comprising at least one repeat unit AC having a structure (I), at least one repeat unit DC comprising a structural unit having a structure (II), and at least one repeat unit BC comprising a structural unit having a structure (III):

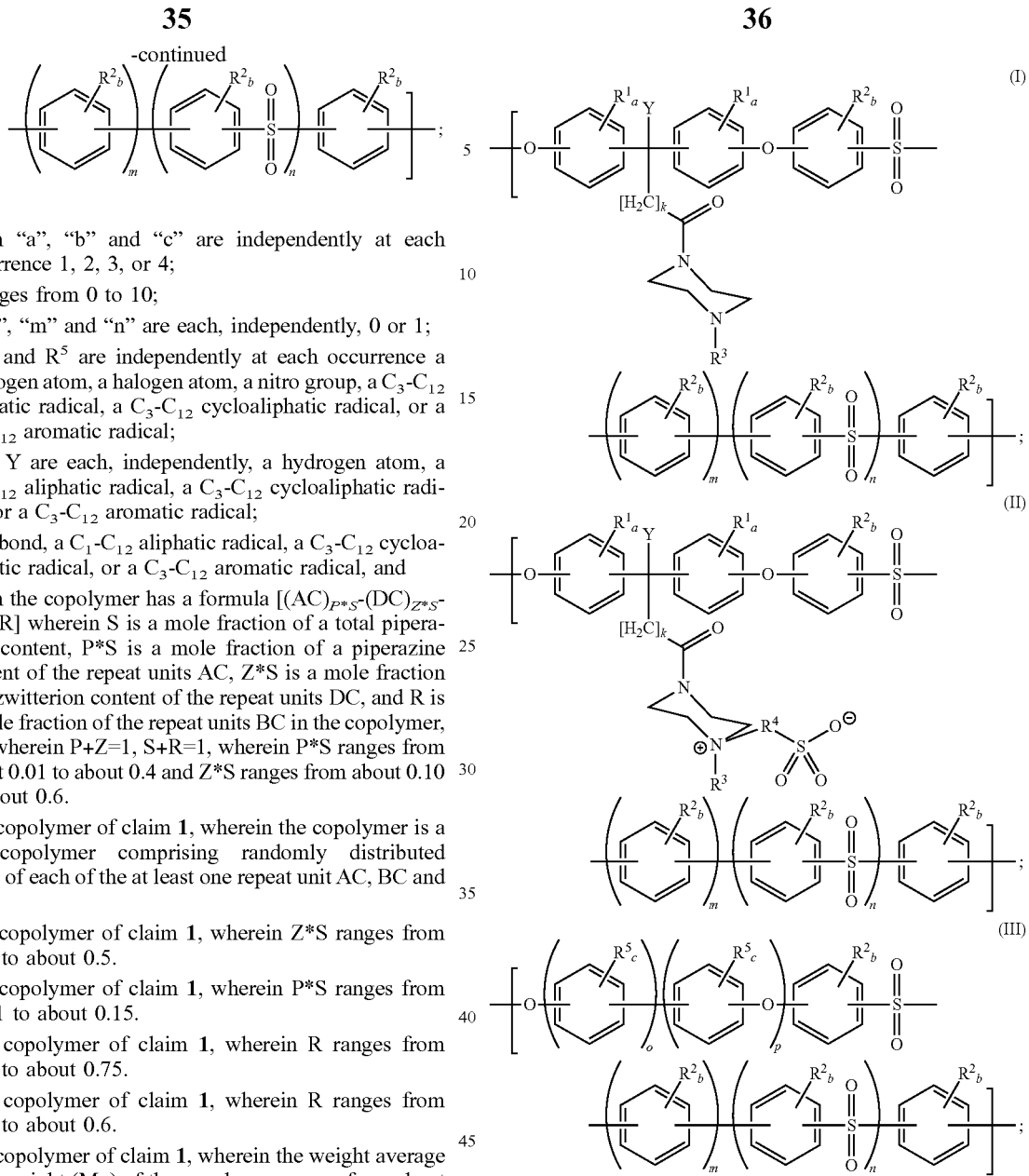

wherein "a", "b" and "c" are independently at each occurrence 1, 2, 3, or 4;

"k" ranges from 0 to 10;

"o", "p", "m" and "n" are each, independently, 0 or 1;

$R^1$, $R^2$ and $R^5$ are independently at each occurrence a hydrogen atom, a halogen atom, a nitro group, a $C_3$-$C_{12}$ aliphatic radical, a $C_3$-$C_{12}$ cycloaliphatic radical, or a $C_3$-$C_{12}$ aromatic radical;

$R^3$ and Y are each, independently, a hydrogen atom, a $C_1$-$C_{12}$ aliphatic radical, a $C_3$-$C_{12}$ cycloaliphatic radical, or a $C_3$-$C_{12}$ aromatic radical;

$R^4$ is a bond, a $C_1$-$C_{12}$ aliphatic radical, a $C_3$-$C_{12}$ cycloaliphatic radical, or a $C_3$-$C_{12}$ aromatic radical, and wherein the copolymer has a formula $[(AC)_{P*S}\text{-}(DC)_{Z*S}\text{-}(BC)R]$ wherein S is a mole fraction of a total piperazine content, P*S is a mole fraction of a piperazine content of the repeat units AC, Z*S is a mole fraction of a zwitterion content of the repeat units DC, and R is a mole fraction of the repeat units BC in the copolymer, and wherein P+Z=1, S+R=1 wherein P*S ranges from about 0.01 to about 0.4 and Z*S ranges from about 0.10 to about 0.6.

12. An apparatus comprising a hollow fiber module comprising a plurality of membranes of claim 11, wherein each membrane is a hollow fiber membrane.

13. A crosslinked polymer, comprising:
the copolymer of claim 11, wherein the copolymer is crosslinked through one or more piperazine groups of the at least one repeat unit AC with a crosslinking agent.

* * * * *